US012566888B2

(12) United States Patent
Pabolu et al.

(10) Patent No.: US 12,566,888 B2
(45) Date of Patent: Mar. 3, 2026

(54) MULTI-LINGUAL NATURAL LANGUAGE GENERATION

(71) Applicant: Oracle International Corporation, Redwood Shores, CA (US)

(72) Inventors: Praneet Pabolu, Bangalore (IN); Karan Dua, Najibabad (IN); Sriram Chaudhury, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 315 days.

(21) Appl. No.: 18/318,327

(22) Filed: May 16, 2023

(65) Prior Publication Data

US 2024/0127004 A1      Apr. 18, 2024

Related U.S. Application Data

(60) Provisional application No. 63/416,779, filed on Oct. 17, 2022.

(51) Int. Cl.
*G06F 21/62*      (2013.01)
*G06F 16/34*      (2025.01)
(Continued)

(52) U.S. Cl.
CPC ........ *G06F 21/6254* (2013.01); *G06F 16/345* (2019.01); *G06F 40/166* (2020.01);
(Continued)

(58) Field of Classification Search
CPC .................................................. G06F 21/6254
See application file for complete search history.

(56) References Cited

U.S. PATENT DOCUMENTS 10,546,054 B1      1/2020   Foroughi et al.
11,907,672 B2      2/2024   Nugent et al.
(Continued)

FOREIGN PATENT DOCUMENTS

EP            3985540 A1      4/2022

OTHER PUBLICATIONS

Feng et al (Year: 2020).*
(Continued)

*Primary Examiner* — Bhavesh M Mehta
*Assistant Examiner* — Joseph J. Yamamoto
(74) *Attorney, Agent, or Firm* — Oracle International Corporation

(57)            ABSTRACT

A computer-implemented method includes obtaining, from text corpus including article-summary pairs in a plurality of languages, a plurality of article-summary pairs in a target language among the plurality of languages, to form an article-summary pairs dataset in which each article corresponds to a summary; inputting articles from the article-summary pairs to a machine learning model; generating, by the machine learning model, embeddings for sentences of the articles; extracting, by the machine learning model, keywords from the articles with a probability that varies based on lengths of the sentences, respectively; outputting, by the machine learning model, the keywords; applying a maximal marginal relevance algorithm to the extracted keywords, to select relevant keywords; and generating a keyword-text pairs dataset that includes the relevant keywords and text from the articles, the text corresponding to the relevant keywords in each of keyword-text pairs of the keyword-text pairs dataset.

20 Claims, 16 Drawing Sheets

(51) Int. Cl.

| | |
|---|---|
| *G06F 40/166* | (2020.01) |
| *G06F 40/216* | (2020.01) |
| *G06F 40/284* | (2020.01) |
| *G06F 40/40* | (2020.01) |
| *G06F 40/47* | (2020.01) |
| *G06F 40/56* | (2020.01) |
| *G06F 40/58* | (2020.01) |
| *G06N 3/045* | (2023.01) |
| *G06N 3/09* | (2023.01) |
| *G06N 20/00* | (2019.01) |

(52) U.S. Cl.
CPC .......... *G06F 40/216* (2020.01); *G06F 40/284* (2020.01); *G06F 40/40* (2020.01); *G06F 40/47* (2020.01); *G06F 40/56* (2020.01); *G06F 40/58* (2020.01); *G06N 3/045* (2023.01); *G06N 3/09* (2023.01); *G06N 20/00* (2019.01)

(56) References Cited

U.S. PATENT DOCUMENTS

| | | | | |
|---|---|---|---|---|
| 2019/0114318 | A1* | 4/2019 | Zhou | G06F 40/284 |
| 2019/0347570 | A1 | 11/2019 | Wang et al. | |
| 2021/0004485 | A1 | 1/2021 | Summers et al. | |
| 2021/0097201 | A1 | 4/2021 | Wasicek et al. | |
| 2021/0326652 | A1 | 10/2021 | Hazard et al. | |
| 2021/0390127 | A1* | 12/2021 | Fox | G06F 16/35 |
| 2022/0059224 | A1 | 2/2022 | Tulley et al. | |
| 2022/0180234 | A1 | 6/2022 | Kamthe et al. | |
| 2024/0054290 | A1* | 2/2024 | Iyer | G06F 40/30 |
| 2024/0249068 | A1* | 7/2024 | Aldred | G06F 16/345 |

OTHER PUBLICATIONS

Cao et al. (Year: 2019).*

Dong et al. (Year: 2020).*

Dong, Li, et al. "Unified language model pre-training for natural language understanding and generation." Advances in neural information processing systems 32 (2019) (Year: 2019).*

Cao, Y., Wan, X., Yao, J., & Yu, D. (2020). MultiSumm: Towards a Unified Model for Multi-Lingual Abstractive Summarization. Proceedings of the AAAI Conference on Artificial Intelligence, 34(01), Apr. 11-18, 2020 (Year: 2020).*

Feng, Fangxiaoyu, et al. "Language-agnostic BERT sentence embedding." arXiv preprint arXiv:2007.01852 (2020) (Year: 2020).*

Beyond English-Centric Multilingual Machine Translation, Available Online at: https://github.com/facebookresearch/fairseq/tree/main/examples/m2m_100, Sep. 20, 2021, 7 pages.

C4, Datasets, Available Online at: https://www.tensorflow.org/datasets/catalog/c4#c4multilingual_nights_stay, Dec. 6, 2022, 15 pages.

Dataset Card for XL-Sum, Available Online at: https://huggingface.co/datasets/csebuetnlp/xlsum, 11 pages, retrieved Apr. 21, 2023.

Language-agnostic BERT Sentence Embedding (LaBSE), Available Online at: https://github.com/bojone/labse, Aug. 24, 2020, 3 pages.

M2M100 418M, Available Online at: https://huggingface.co/facebook/m2m100_418M, 2010, 5 pages, retrieved Apr. 21, 2023.

Welcome to the Leipzig Corpora Collection/Deutscher Wortschatz, A project of Leipzig University, the Saxon Academy of Sciences and Humanities in Leipzig and the Institute for Applied Informatics. Available Online at: https://wortschatz.uni-leipzig.de, 1998, 4 pages.

Bennani-Smires et al., Simple Unsupervised Keyphrase Extraction using Sentence Embeddings, Available Online at: https://arxiv.org/pdf/1801.04470.pdf, Sep. 5, 2018, 9 pages.

Carbonell et al., The Use of MMR, Diversity-Based Reranking for Reordering Documents and Producing Summaries, In Proceedings of the 21st Annual International ACM SIGIR Conference on Research and Development in Information Retrieval, Aug. 1998, pp. 335-336.

Dorr et al., Testing Code Using Synthetic Data, Technical Disclosure Commons, Oct. 2, 2019, pp. 1-8.

Fan et al., Beyond English-Centric Multilingual Machine Translation, Computation and Language, Available Online at: https://arxiv.org/abs/2010.11125, Oct. 21, 2020, pp. 1-38.

Feng et al., Language-Agnostic BERT Sentence Embedding, Computation and Language, Available Online at: https://arxiv.org/abs/2007.01852, Mar. 8, 2022, 14 pages.

Galloni et al., A Novel Evaluation Metric for Synthetic Data Generation, Intelligent Data Engineering and Automated Learning, Oct. 2020, 2 pages.

Grootendorst, Keyword Extraction with Bert, A Minimal Method for Extracting Keywords and Keyphrases, Towards Data Science, Oct. 29, 2020, pp. 1-19.

Hendricks, Generate Data Containing Fake Personally Identifiable Information, Available Online at: https://github.com/paulhendricks/generator, Aug. 26, 2015, 8 pages.

Hillborn, Anonymizing Datasets at Scale Leveraging Databricks Interoperability, Databricks, Feb. 13, 2017, 8 pages.

Kondamari et al., Custom Models and Text Translation Come to OCI Language, Oracle AI & Data Science Blog, Available Online at: https://blogs.oracle.com/ai-and-datascience/post/custom-models-text-translation-oci-language, Nov. 2, 2022, 6 pages.

Ladhak et al., Wiki_lingua, Available Online at: https://gem-benchmark.com/data_cards/wiki_lingua, 2020, 5 pages.

Lee, Natural Language Generation for Electronic Health Records, npj Digital Medicine, vol. 1, No. 63, Nov. 19, 2018, 7 pages.

Stahlberg et al., C4_200M Synthetic Dataset for Grammatical Error Correction, Available Online at: https://github.com/google-research-datasets/C4_200M-synthetic-dataset-for-grammatical-error-correction, Aug. 10, 2021, pp. 1-5.

Xue et al., mT5: A Massively Multilingual Pre-trained Text-to-Text Transformer, Computation and Language, Mar. 11, 2021, 17 pages.

U.S. Appl. No. 18/318,315, "Corrected Notice of Allowability", Aug. 5, 2025, 6 pages.

U.S. Appl. No. 18/318,315, Notice of Allowance, Mailed On Aug. 5, 2025, 9 pages.

Yan et al., "Adaft: An Efficient Domain-adaptive Fine-tuning Framework for Sentiment Analysis in Chinese Financial Texts", Applied Intelligence, vol. 55, No. 701, Apr. 29, 2025, 23 pages.

* cited by examiner

Figure 2:
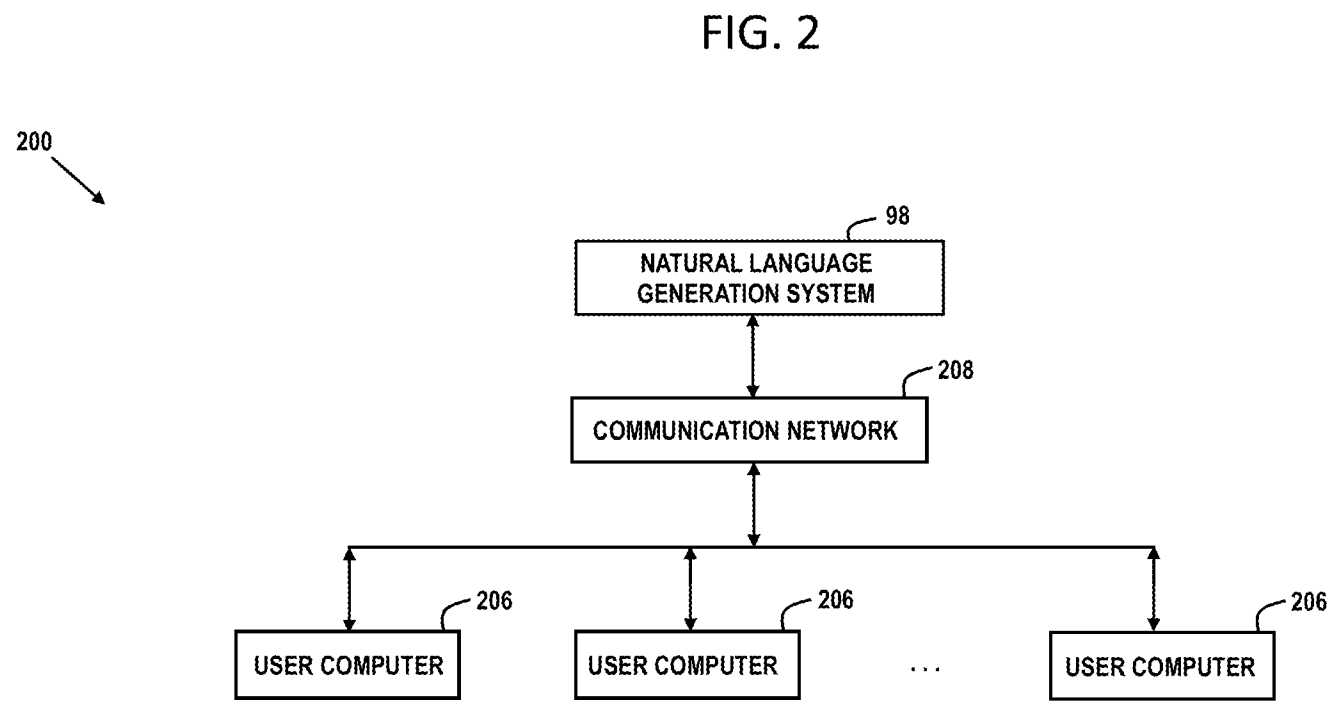

NATURAL LANGUAGE GENERATION SYSTEM

208

COMMUNICATION NETWORK

206

USER COMPUTER

206

USER COMPUTER

206

USER COMPUTER

200

FIG. 4A
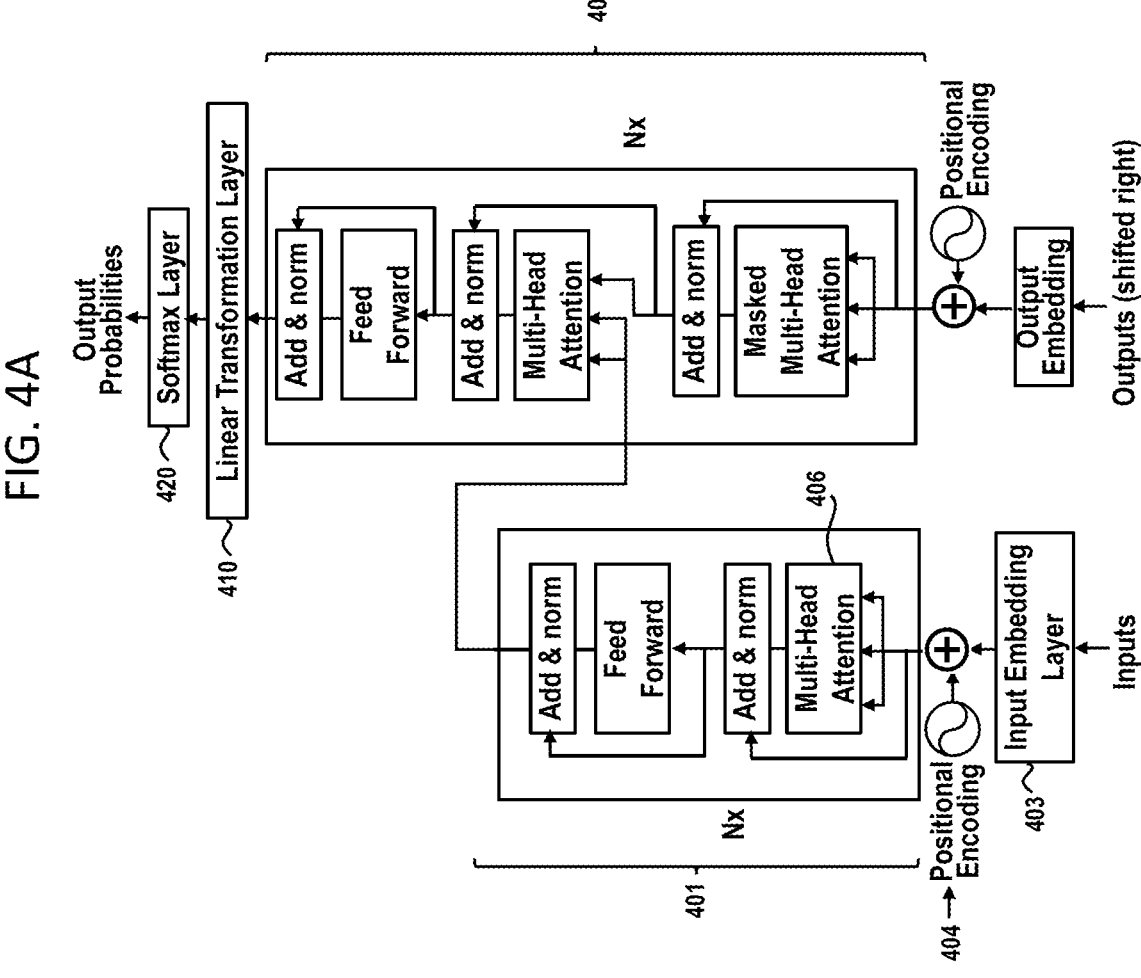

FIG. 5

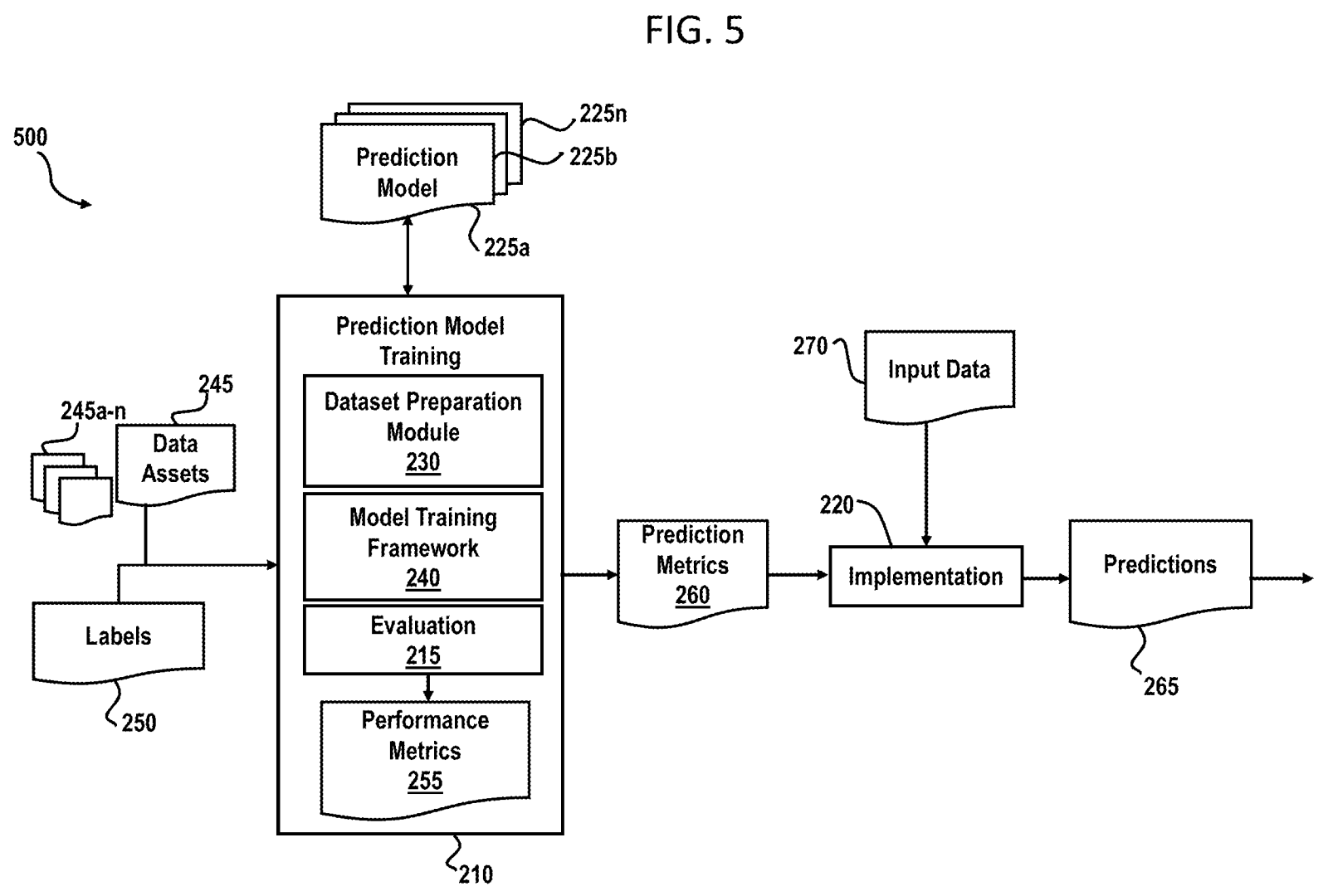

Predictions 265

Input Data 270

Implementation 220

Prediction Metrics 260

Prediction Model 225a / 225b / 225n

Prediction Model Training 210
- Dataset Preparation Module 230
- Model Training Framework 240
- Evaluation 215
- Performance Metrics 255

Data Assets 245 / 245a-n

Labels 250

Figure 7A:
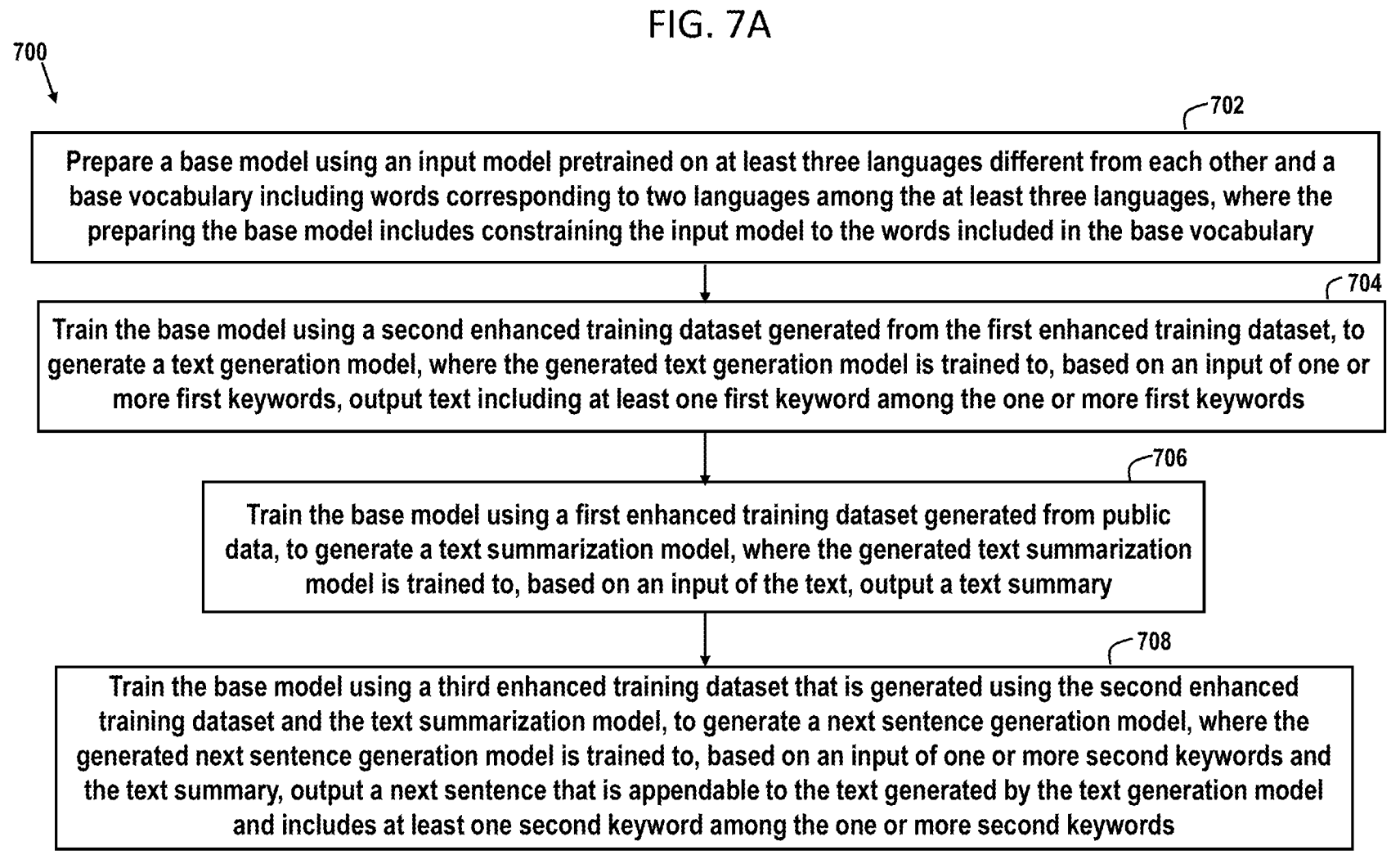

Prepare a base model using an input model pretrained on at least three languages different from each other and a base vocabulary including words corresponding to two languages among the at least three languages, where the preparing the base model includes constraining the input model to the words included in the base vocabulary

704

Train the base model using a second enhanced training dataset generated from the first enhanced training dataset, to generate a text generation model, where the generated text generation model is trained to, based on an input of one or more first keywords, output text including at least one first keyword among the one or more first keywords

706

Train the base model using a first enhanced training dataset generated from public data, to generate a text summarization model, where the generated text summarization model is trained to, based on an input of the text, output a text summary

708

Train the base model using a third enhanced training dataset that is generated using the second enhanced training dataset and the text summarization model, to generate a next sentence generation model, where the generated next sentence generation model is trained to, based on an input of one or more second keywords and the text summary, output a next sentence that is appendable to the text generated by the text generation model and includes at least one second keyword among the one or more second keywords

Figure 7B:
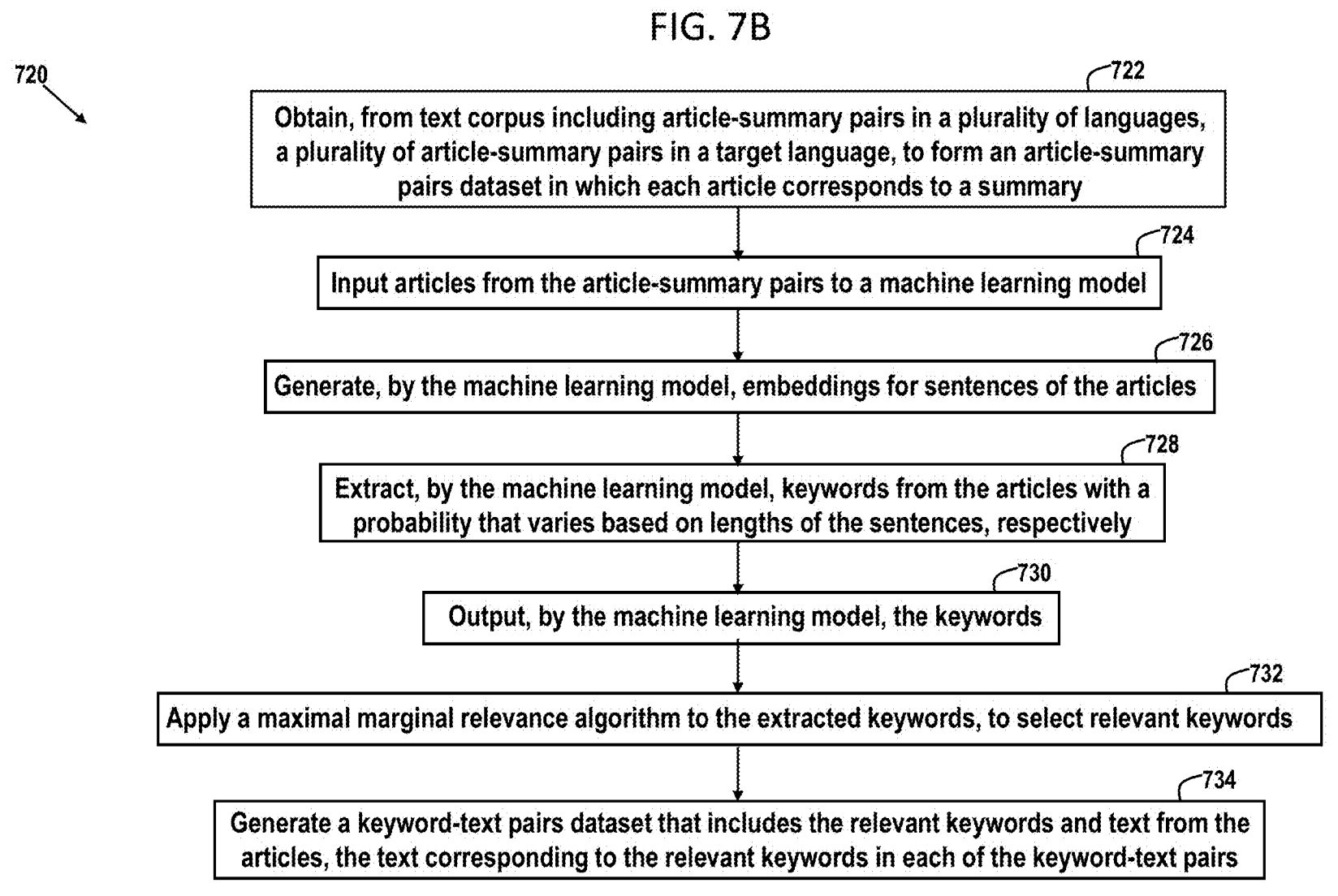

Obtain, from text corpus including article-summary pairs in a plurality of languages, a plurality of article-summary pairs in a target language, to form an article-summary pairs dataset in which each article corresponds to a summary

724

Input articles from the article-summary pairs to a machine learning model

726

Generate, by the machine learning model, embeddings for sentences of the articles

728

Extract, by the machine learning model, keywords from the articles with a probability that varies based on lengths of the sentences, respectively

730

Output, by the machine learning model, the keywords

732

Apply a maximal marginal relevance algorithm to the extracted keywords, to select relevant keywords

734

Generate a keyword-text pairs dataset that includes the relevant keywords and text from the articles, the text corresponding to the relevant keywords in each of the keyword-text pairs

MULTI-LINGUAL NATURAL LANGUAGE GENERATION

CROSS-REFERENCE TO RELATED APPLICATION(S)

The present application is a non-provisional application of and claims the benefit and priority under 35 U.S.C. 119(e) of U.S. Provisional Application No. 63/416,779, filed Oct. 17, 2022, the entire contents of which are incorporated herein by reference for all purposes.

FIELD

The present disclosure relates generally to natural language generation, and more particularly, to automated entity alignment and knowledge distillation via two-fold fine-tuning for multi-lingual natural language generation.

BACKGROUND

Machine learning (ML) is an area of artificial intelligence (AI) where computers have the capability to learn without being explicitly programmed. There are different types of ML techniques including supervised learning techniques, unsupervised learning techniques, and others. In a supervised learning technique, an ML model is created and trained using training data, where the training data includes multiple training examples, each training example including an input and a known output corresponding to the input. An input can include one or multiple features.

As a part of the training, the model being trained learns a function that maps the inputs in the training data to their corresponding known outputs. After a model has been adequately trained using the training data, it can then be used for making output predictions for new inputs where the outputs are not known. This is often referred to as the inferencing phase.

Natural language generation (NLG) uses the AI techniques to produce written or spoken narratives from a dataset. NLG is related to human-to-machine and machine-to-human interaction, including computational linguistics, natural language processing (NLP) and natural language understanding (NLU).

However, NLG for performing specific tasks is currently not available in different languages, e.g., due to the lack of annotated data associated with the data required for specific tasks, such as, for example, named entity recognition (NER), sequence classification, text classification, etc.

Accordingly, there is a need for the models that can generate data in multiple languages that can be used for training NER-based models.

SUMMARY

Techniques disclosed herein relate generally to natural language generation techniques. More specifically and without limitation, techniques disclosed herein relate to a novel technique for automated entity alignment and knowledge distillation via two-fold fine-tuning for multi-lingual natural language generation.

Various embodiments are described herein to illustrate various features. These embodiments include various methods, systems, non-transitory computer-readable storage media storing programs, code, or instructions executable by one or more processors, and the like.

In various embodiments, a computer-implemented method is provided that includes preparing a base model using an input model pretrained on at least three languages different from each other and a base vocabulary including words corresponding to two languages among the at least three languages, where the preparing the base model includes constraining the input model to the words included in the base vocabulary; training the base model using a first enhanced training dataset generated from public data, to generate a text summarization model; training the base model using a second enhanced training dataset generated from the first enhanced training dataset, to generate a text generation model; and training the base model using a third enhanced training dataset that is generated using the second enhanced training dataset and the text summarization model, to generate a next sentence generation model, where the generated text generation model is trained to, based on an input of one or more first keywords, output text including at least one first keyword among the one or more first keywords, the generated text summarization model is trained to, based on an input of the text, output a text summary, and the generated next sentence generation model is trained to, based on an input of one or more second keywords and the text summary, output a next sentence that is appendable to the text generated by the text generation model and includes at least one second keyword among the one or more second keywords.

In some embodiments, each of the text generation model, the text summarization model, and the next sentence generation model is a bilingual model that is trained on the two languages including a target language and English, and configured to output predictions based on an input provided in the target language, English, or a mixed language in which the target language and English are intermixed.

In some embodiments, the input model is a transformer-based model.

In some embodiments, the input model is an mT5 model.

In some embodiments, the base model is a modified mT5 model, and, in the base model, a vocabulary of the mT5 model is restricted to a first number of words in a target language and a second number of words in English.

In some embodiments, the first enhanced training dataset includes article-summary pairs, and for each article-summary pair, an article serves as an input training datapoint and a corresponding summary serves as a given output, the second enhanced training dataset includes keyword-text pairs, and, for each keyword-text pair, one or more keywords serve as an input training datapoint and a corresponding text serves as a given output, and the third enhanced training dataset includes summary-keywords-next sentence triplets, and, for each summary-keywords-next sentence triplet, a summary and keywords serve as an input training datapoint and a corresponding next sentence serves as a given output.

In some embodiments, the computer-implemented method further includes generating a plurality of refined models by training the text generation model and the next sentence generation model using a plurality of refined training datasets generated using the text summarization model and private data.

In some embodiments, the plurality of refined models includes a refined text generation model and a refined next sentence generation model.

In some embodiments, the generating the plurality of refined models further includes: training the text generation model using a first refined training dataset among the plurality of refined training datasets, to generate the refined text generation model, where the first refined training dataset is generated based on the private data and includes fake values given to entity values included in the private data, and training the next sentence generation model using a second refined training dataset among the plurality of refined training datasets, to generate the refined next sentence generation model, where the second refined training dataset is generated using the first refined training dataset and the text summarization model.

In some embodiments, the refined text generation model is trained to, based on an input of one or more first entity values, output text including at least one first entity value among the one or more first entity values, and the refined next sentence generation model is trained to, based on an input of one or more second entity values and a primary text summary generated by the text summarization model based on the text output by the refined text generation model, output a next sentence that is appendable to the text output by the refined text generation model and includes at least one second entity value among the one or more second entity values.

In various embodiments, a computer-implemented method is provided that includes obtaining, from text corpus including article-summary pairs in a plurality of languages, a plurality of article-summary pairs in a target language among the plurality of languages, to form an article-summary pairs dataset in which each article corresponds to a summary; inputting articles from the article-summary pairs to a machine learning model; generating, by the machine learning model, embeddings for sentences of the articles; extracting, by the machine learning model, keywords from the articles with a probability that varies based on lengths of the sentences, respectively; outputting, by the machine learning model, the keywords; applying a maximal marginal relevance algorithm to the extracted keywords, to select relevant keywords; and generating a keyword-text pairs dataset that includes the relevant keywords and text from the articles, the text corresponding to the relevant keywords in each of the keyword-text pairs.

In some embodiments, the obtaining the plurality of article-summary pairs further includes: identifying, in the text corpus; a set of article-summary pairs to include the article-summary pairs in the target language, filtering the article-summary pairs of the set to exclude article-summary pairs having, in a corresponding article, a number of words exceeding a threshold number of words; dividing the article-summary pairs of the set that have a number of words in a corresponding article no more than the threshold number of words, into a plurality of groups based on a word count in articles of the article-summary pairs; and forming the article-summary pairs dataset by selecting a different number of article-summary pairs from each of the plurality of groups, so that a group having the article-summary pairs with a smallest word count in the articles represents a largest apportionment in the article-summary pairs dataset and a group having the article-summary pairs with a greatest word count in the articles represents a smallest apportionment in the article-summary pairs dataset.

In some embodiments, the machine learning model is a language agnostic BERT sentence embedding (LAB SE) model.

In some embodiments, the keyword-text pairs dataset is used to train a text generation model, where the relevant keywords are used as input training datapoints and, during training, the text generation model learns, based on an input of a relevant keyword, output the text corresponding to the relevant keywords.

In some embodiments, the article-summary pairs dataset is used to train a text summarization model, where the articles are used as input training datapoints and, during training, the text summarization model learns, based on an input of an article, output a text summary corresponding to the article.

In some embodiments, the computer-implemented method further includes: generating a summary-keyword-next sentence triplets dataset using the keyword-text pairs dataset and the text summarization model.

In some embodiments, the computer-implemented method further includes: tokenizing sentences of a paragraph of the text of a keyword-text pair of the keyword-text pairs dataset; and recursively calculating, using the text summarization model, text summaries of the tokenized sentences.

In some embodiments, the generating the summary-keyword-next sentence triplets dataset further includes: associating, with a text summary of one or more first tokenized sentences of a preceding text of a paragraph, keywords that are present in a subsequent text of the paragraph that follows the preceding text, the one or more first tokenized sentences being included in the tokenized sentences, and associating, the keywords that are present in the subsequent text, with one or more second tokenized sentences of the subsequent text, the one or more second tokenized sentences being included in the tokenized sentences.

In some embodiments, the summary-keyword-next sentence triplets dataset is used to train a next sentence generation model, where the text summary of the preceding text and the keywords present in the subsequent text that are associated with the text summary of the preceding text, are used as input training datapoints and, during training, the next sentence generation model learns, based on an input of the text summary of the preceding text and the keywords present in the subsequent text, output one or more next sentences that are appendable to the preceding text and include the keywords input to the next sentence generation model.

Some embodiments of the present disclosure include a system including one or more data processors. In some embodiments, the system includes a non-transitory computer-readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 1B is a block diagram of a portion of a natural language generation system according to various embodiments.

FIG. 2 is a simplified block diagram of a natural language generation system in a distributed computing environment according to various embodiments.

FIG. 4A shows an example of mT5 model according to various embodiments.

FIG. 5 depicts a block diagram of a prediction model training and deployment system in accordance with various embodiments.

FIG. 7A depicts processing performed by the natural language generation system according to various embodiments.

FIG. 7B depicts processing performed by the natural language generation system according to various embodiments.

DETAILED DESCRIPTION

Figure 1A:
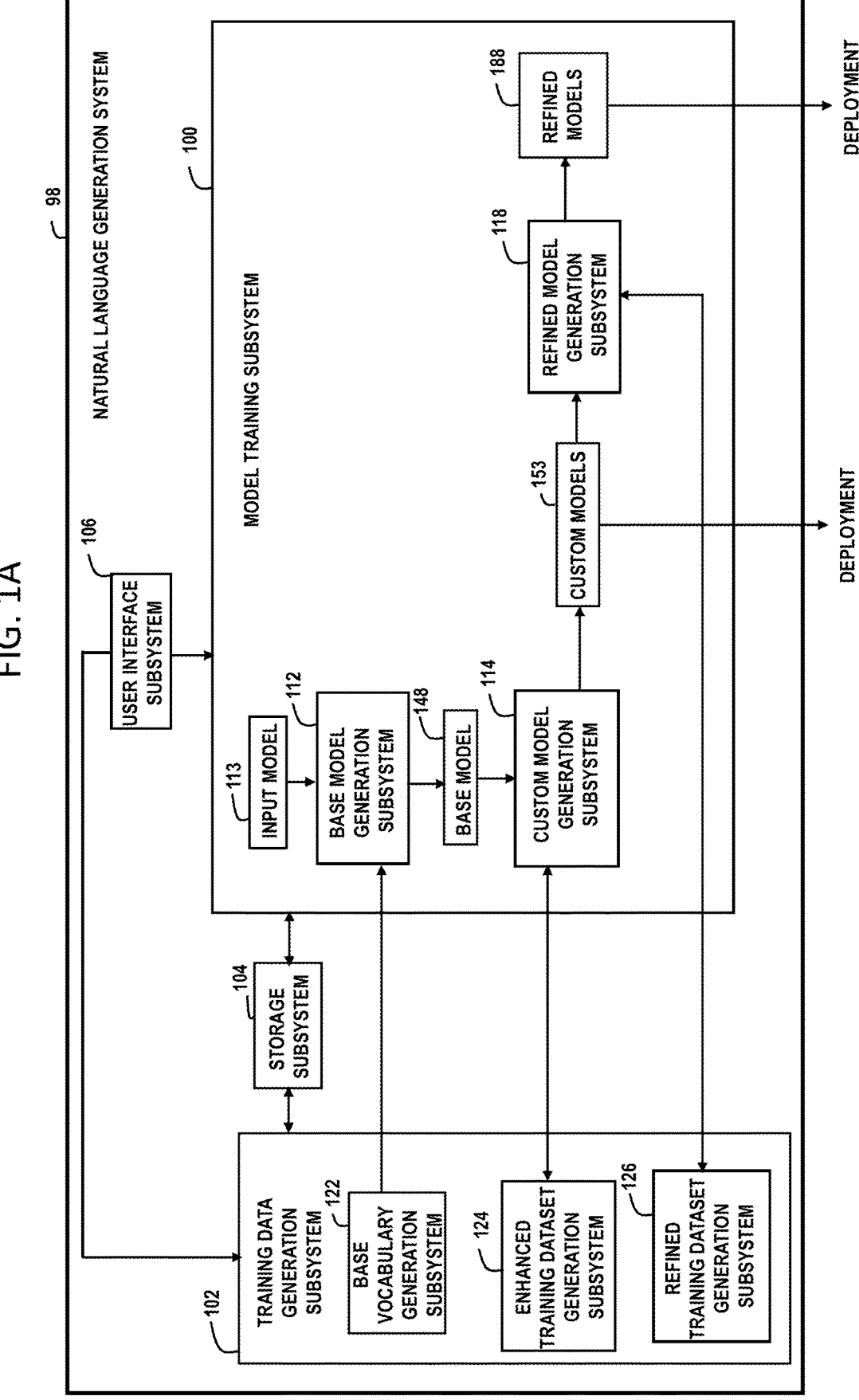
FIG. 1A is a block diagram of a natural language generation system according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. INTRODUCTION

The present disclosure relates generally to artificial intelligence techniques, and more particularly, techniques disclosed herein relate to a novel technique for automated entity alignment and knowledge distillation via two-fold fine-tuning for multi-lingual natural language generation.

Recently, there has been a great deal of research conducted with regard to NLG. Open-source models are available for English language that makes it easier to experiment with or generate coherent texts around the desired entities. However, the same is not true when the tasks involve multiple languages, e.g., 100 languages.

The described techniques use an algorithm that defines a process flow of combining multiple deep learning models each having a specific objective to generate synthetic texts along with annotations associated with the desired entities.

In a novel approach, a single base model is generated by fine-tuning a modified version of Multi-Lingual T5 (mT5) model capable of generating texts in 100+ languages. The base model is then used to generate three different custom models each having its own objective. The custom models are later used to generate unique texts for specific tasks or requirements.

In embodiments, after the base model is generated, the custom models are generated in in a bilingual form, e.g., the custom models are able to understand the target language and English. English language is included in the models in conjunction with the target language because English is generally used interchangeably in conversations. Thus, it is beneficial for the models to have some understanding of English to perform better during the natural language generation processes.

The single ensemble of models can be used to generate hundreds of thousands of unique texts across multiple languages, where a first custom model can generate text based on input keywords, a second custom model can summarize text based on input sentences, and a third custom model can generate a next sentence based on a summary of the text that is generated by the second custom model and a string of given multiple keywords. The next sentence can be then appended to the previously generated text to generate a coherent natural language text. Four different objectives for data generation are defined following a unique automated approach, where the generated data is used for bilingual understanding of the text: to generate bilingual text using entity information, summarize the bilingual text, and generate the bilingual next sentence.

The described techniques automatically generate training datasets using four objectives with respect to the models:

a. For the objective of base model: Using the modified architecture of the mT5 model and public data of the first corpora, constrain and fine-tune the modified mT5 model to update the model weights and make the model bilingual.

b. For the objective of the first custom model, e.g., the text generation model: Keyword extraction is used on different public data, e.g., second corpora including article-summary pairs, using Language Agnostic BERT Sentence Embedding (LABSE) model embeddings with a probability that varies based on the lengths of sentences. By employing a method of Maximal Marginal relevance, which tries to minimize the redundancy and maximize the diversity, it is ensured the right keywords are picked from the data for fine-tuning. The description of LAB SE can be found in a publication entitled "Language-agnostic BERT Sentence Embedding" by Feng, which is incorporated by reference herein.

c. For the objective of the second custom model, e.g., the text summarization model: Article-Summary pairs collected from the second public corpora are directly used.

d. For the objective of the third custom model, e.g., the next sentence generation model: Keyword extracted data and the text summarization model define this model's objective.

The custom models can be further fine-tuned to be used with private data, e.g., data including personal identifiable information (PII) entities, financial entities, medical entities, etc.

The described techniques use a two-fold fine-tuning, e.g., (i) using public data and (ii) using private data. This ensures that the text being generated is coherent in nature and accommodates all the required entities in a manner that those entities are meant to be presented in the text. At the first fold, a great amount of public data provides the context and input structure of the specific model. The second fold, which deals with the private data, acts as a component required for entity-specific context for the final models.

The described techniques generate coherent multi-lingual texts across various PII entities, protected health information entities, etc., where only a small set of data, e.g., 50 examples, is used to adapt to the entity for generating texts around the entity.

In some embodiments, the approach further involves generating the fake values for entity values in a desired language before injecting them in the model. For example, the fake values can be created to identify the entity types and, thus, it is known what to look for in the output and the text can be used to train language models. The solution solves the problem of the annotations that is tedious and time-consuming job. Further, the generated synthetic data is completely free of true entity values corresponding to PII entities, thus enabling the training of the downstream models on realistic data without breaching privacy.

Parameters in the models can be configured for generating hundreds of unique texts from just a single input. The novel approach can be extended to any domain in language that deals with classification.

Automated approach of the described techniques for developing models removes manual process of acquiring desired model to fit with required objective.

According to the described techniques, the generated data is semantically meaningful and structurally variant with texts in multiple domains of e-commerce, finance, medical, day-to-day life, etc., that helps the models to generalize on different language domains.

Techniques disclosed herein allow the generation of the model that allow knowledge-sharing across different tasks, easy adaptation to new use case(s) with minimal resource engagement, and shorter development and deployment cycle.

In various embodiments, a computer-implemented method is provided that includes obtaining, from text corpus including article-summary pairs in a plurality of languages, a plurality of article-summary pairs in a target language among the plurality of languages, to form an article-sum-mary pairs dataset in which each article corresponds to a summary; inputting articles from the article-summary pairs to a machine learning model; generating, by the machine learning model, embeddings for sentences of the articles; extracting, by the machine learning model, keywords from the articles with a probability that varies based on lengths of the sentences, respectively; outputting, by the machine learning model, the keywords; applying a maximal marginal relevance algorithm to the extracted keywords, to select relevant keywords; and generating a keyword-text pairs dataset that includes the relevant keywords and text from the articles, the text corresponding to the relevant keywords in each of the keyword-text pairs.

In various embodiments, a computer-implemented method is provided that includes preparing a base model using an input model pretrained on at least three languages different from each other and a base vocabulary including words corresponding to two languages among the at least three languages, where the preparing the base model includes constraining the input model to the words included in the base vocabulary; training the base model using a first enhanced training dataset generated from public data, to generate a text summarization model, training the base model using a second enhanced training dataset generated from the first enhanced training dataset, to generate a text generation model; and training the base model using a third enhanced training dataset that is generated using the second enhanced training dataset and the text summarization model, to generate a next sentence generation model, where the generated text generation model is trained to, based on an input of one or more first keywords, output text including at least one first keyword among the one or more first key-words, the generated text summarization model is trained to, based on an input of the text, output a text summary, and the generated next sentence generation model is trained to, based on an input of one or more second keywords and the text summary, output a next sentence that is appendable to the text generated by the text generation model and includes at least one second keyword among the one or more second keywords.

The described techniques allow decreasing the size of the input model, as compared to the mT5 model, by decreasing the built-in vocabulary and constraining the vocabulary to the careful selection of words in a target language and English. This results in a reduced size of the base model (32% on an average), in comparison to the mT5 model. With a smaller model, the embodiments achieve very high infer-ence speed, for the models that are later trained using the base model. Also, by building the training datasets as described herein, the models capable of understanding a target language mixed with English can be obtained.

Using the techniques described above, a number of bilin-gual base models and custom models for any given target language and another language may be generated and stored for future use.

As a result of the processing described herein, a plurality of various training datasets may be automatically generated for specific objectives of each of the models. For example, as described herein, the enhanced training datasets may be first generated by exhaustively mining public data sources and then performing specific processes to correct, filter, and improve extracted content. Then, the refined training data-sets may be generated by using a small amount of private data and a machine learning model trained on the enhanced training dataset(s).

II. NATURAL LANGUAGE GENERATION SYSTEM

FIG. 1A is a simplified block diagram of a natural language generation system 98 according to certain embodi-ments. The natural language generation system 98 may be implemented using one or more computer systems, each computer system having one or more processors. The natural language generation system 98 may include multiple com-ponents and subsystems communicatively coupled to each other via one or more communication mechanisms. For example, in the embodiment depicted in FIG. 1A, the natural language generation system 98 includes a model training subsystem 100 and a training data generation subsystem 102. These subsystems may be implemented as one or more computer systems. The systems, subsystems, and other components depicted in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As shown in FIG. 1A, the natural language generation system 98 also includes a storage subsystem 104 that may store the various data constructs and programs used by the natural language generation system 98, as described in detail below. In certain implementations, the natural language generation system 98 may further include a user interface (UI) subsystem 106 for receiving a user input.

The natural language generation system 98 depicted in FIG. 1A is merely an example and is not intended to unduly limit the scope of embodiments. Many variations, alternatives, and modifications are possible. For example, in some implementations, natural language generation system 98 may have more or fewer subsystems or components than those shown in FIG. 1A, may combine two or more subsystems, or may have a different configuration or arrangement of subsystems. The natural language generation system 98 and subsystems depicted in FIG. 1A may be implemented using one or more computer systems, such as the computer system depicted in FIG. 12.

In certain implementations, the model training subsystem 100 is configured to perform multi-stage processing starting with a preparatory processing stage performed by a base model generation subsystem 112 on an input model 113 using training data generated by the training data generation subsystem 102. In some implementations, the multi-stage processing performed by the model training subsystem 100 further includes a first training stage and a second training stage that are performed by a custom model generation subsystem 114 and a refined model generation subsystem 118, respectively. Each of the processing stages uses training data generated by the training data generation subsystem 102 for a specific processing stage. The processes and functions of the subsystems of the training data generation subsystem 102 and the model training subsystem 100 are described below in more detail with reference to FIGS. 1B and 1C.

Figure 1B:
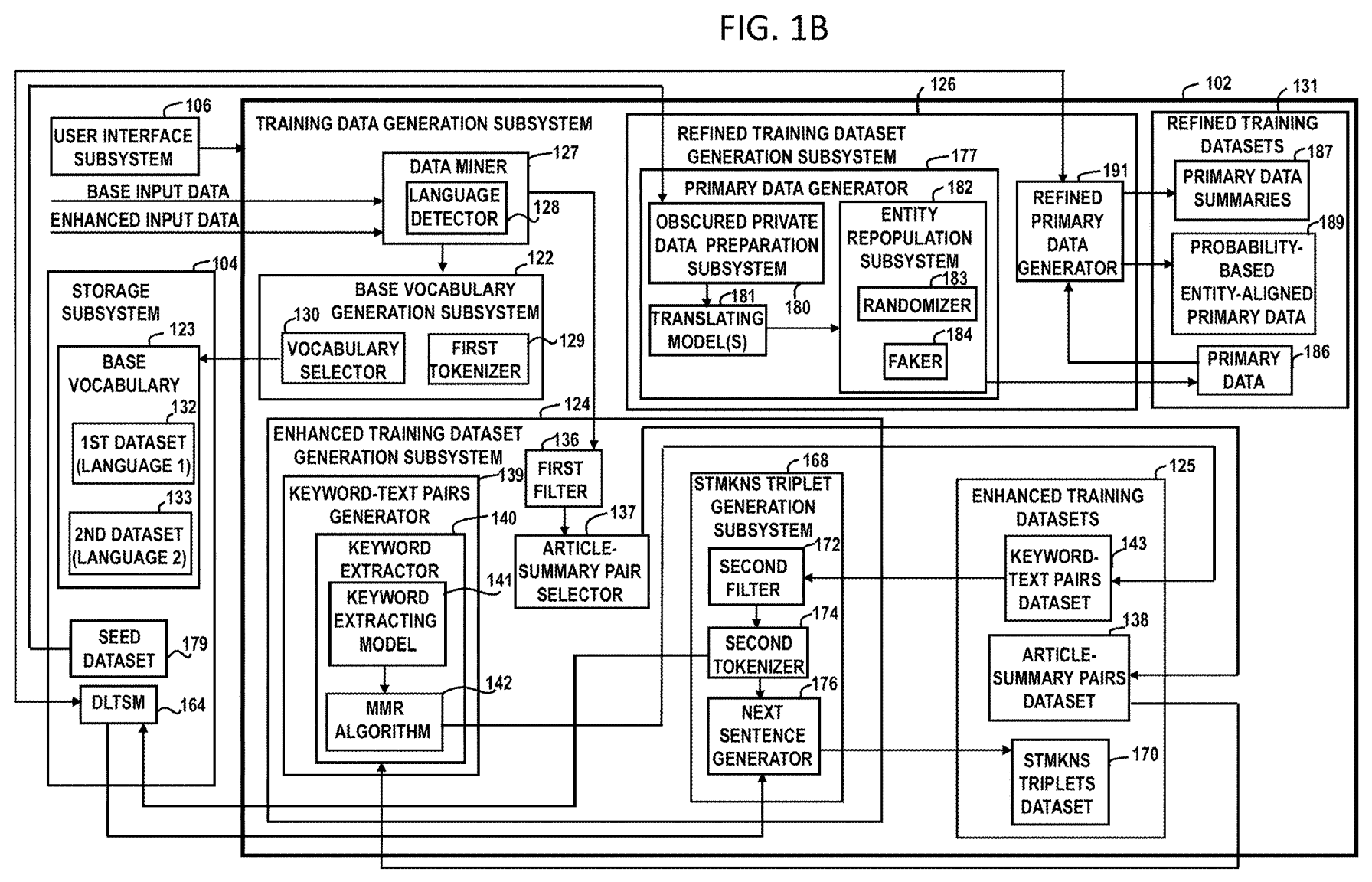

With continuing reference to FIG. 1A and further reference to FIG. 1B, the training data generation subsystem 102 may include multiple components and subsystems communicatively coupled to each other via one or more communication mechanisms. For example, the training data generation subsystem 102 includes a base vocabulary generation subsystem 122 for generating a base vocabulary 123 used by the model training subsystem 100 at the preparatory processing stage, an enhanced training dataset generation subsystem 124 for generating one or more enhanced training datasets 125 used by the model training subsystem 100 at the first training stage, and a refined training dataset generation subsystem 126 for generating one or more refined training datasets 131 used by the model training subsystem 100 at the second training stage.

Operations of the base vocabulary generation subsystem 122, the enhanced training dataset generation subsystem 124, and the refined training dataset generation subsystem 126 are described in detail below.

Figure 1C:
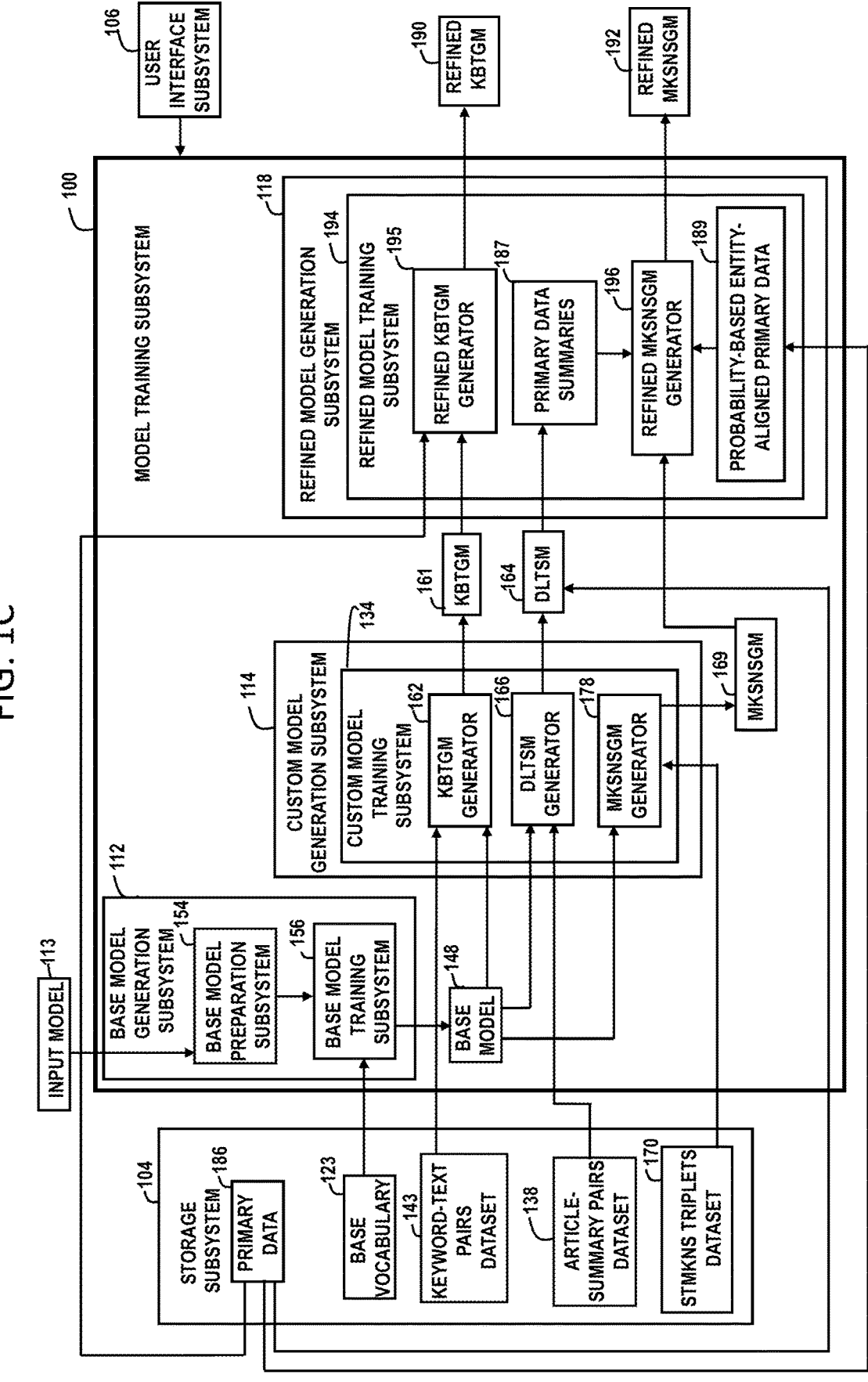
FIG. 1C is a block diagram of a portion of a natural language generation system according to various embodiments.

With continuing reference to FIG. 1A and further reference to FIG. 1C, the model training subsystem 100 is configured to perform multi-stage training as mentioned above. The model training performed by the model training subsystem 100 includes the preparatory processing stage where a base model is generated, the first training stage where the base model is trained to generate custom models using public data, and the second training stage where the custom models are refined using private data. The preparatory processing stage, the first training stage, and the second training stage may be performed by the base model generation subsystem 112, the custom model generation subsystem 114, and the refined model generation subsystem 118, respectively. Each of these training stages and the functions performed by these subsystems are described below in more detail.

Figure 12:
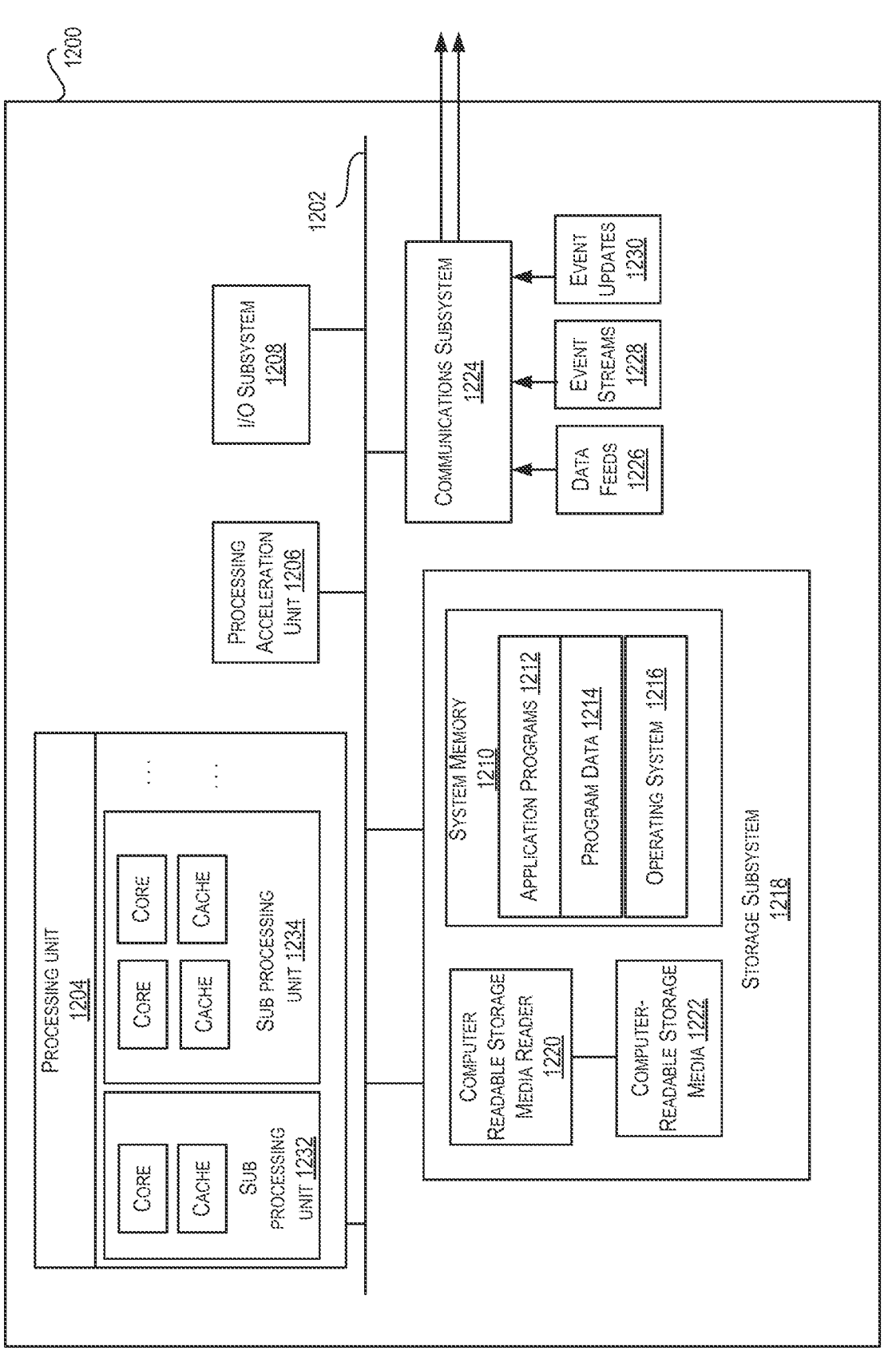
FIG. 12 is a block diagram illustrating an example computer system, according to at least one embodiment.

As shown in FIG. 2, the natural language generation system 98 can be provided as a part of a distributed computing environment 200, where the natural language generation system 98 is connected to one or more user computers 206 via a communication network 208. An example of a distributed computing environment is depicted in FIG. 12 and described in detail below.

Figure 3:
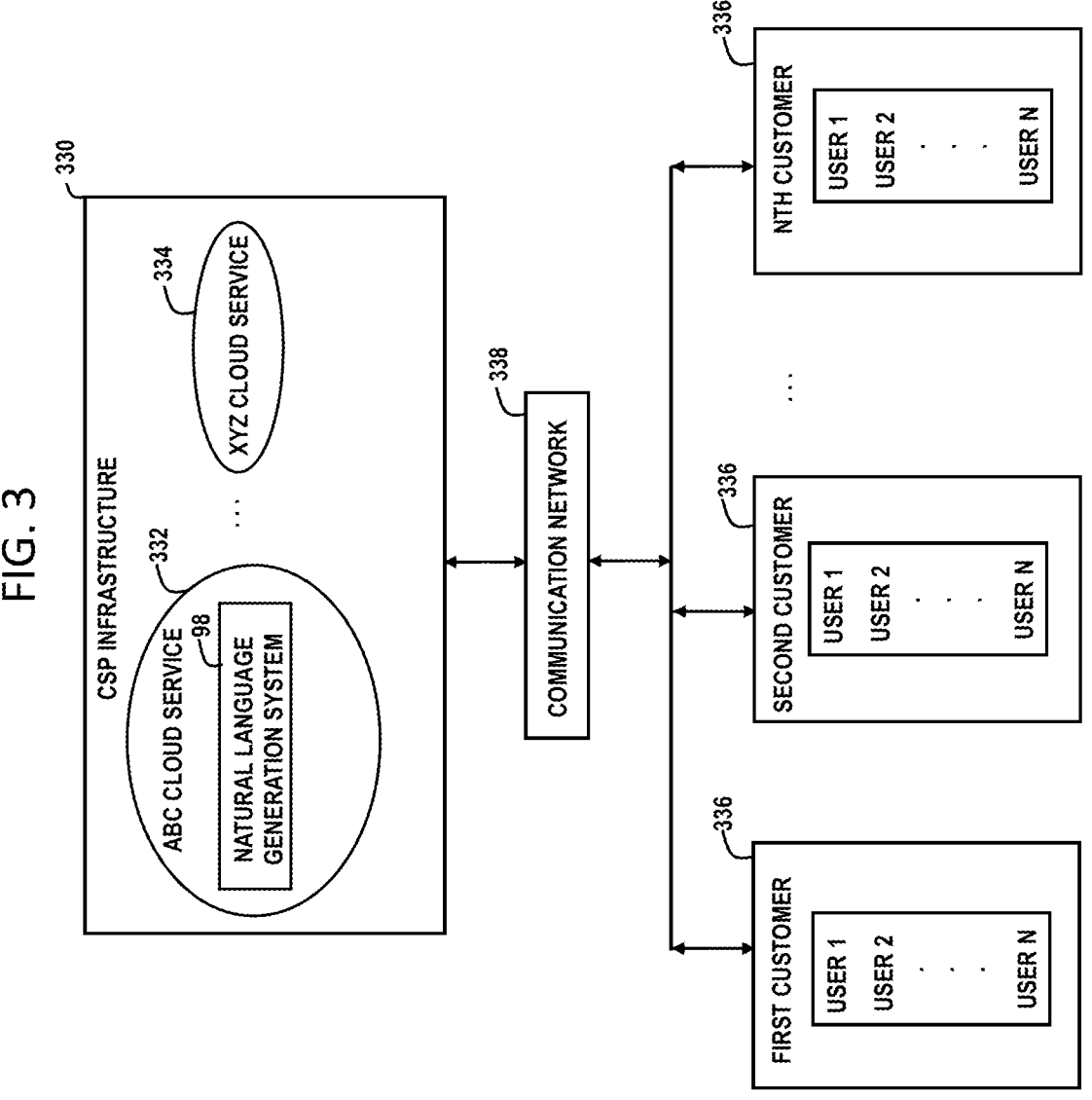
FIG. 3 is a simplified block diagram of a natural language generation system in a cloud service provider (CSP) infrastructure according to various embodiments.

As shown in FIG. 3, the natural language generation system 98 may be a part of a CSP infrastructure 330 provided by a CSP for providing one or more cloud services. For example, the one or more cloud services may include ABC cloud service 332 to XYZ cloud service 334 connected to computers of one or more customers 336 via a communication network 338. For example, the natural language generation system 98 may be a part of the ABC cloud service 332.

Examples of a cloud infrastructure architecture provided by the CSP are depicted in FIGS. 8-11 and described in detail below.

A. Base Vocabulary Generation

With continuing reference to FIG. 1A and reference again to FIG. 1B, the training data generation subsystem 102 may receive, as an input, base input data from a large text corpus and perform the processing on the base input data that results in a generation of the base vocabulary 123. The base vocabulary 123 generated by the training data generation subsystem 102 then can be used as an input for the preparatory processing stage performed by the base model generation subsystem 112. As a non-limiting example, in an embodiment, the training data generation subsystem 102 generates the base vocabulary 123 for at least two languages where one language is English. The reason for this is that, in today's world, the use of English is mixed in everyday use when people speak other languages. Accordingly, the training data generation subsystem 102 generates the base vocabulary 123 so that the model training subsystem 100 can generate a bilingual base model.

In certain implementations, the training data generation subsystem 102 may include a data miner 127. The data miner 127 can obtain or receive the base input data and perform certain processing on the base input data, to output data in one or more languages. For example, the data miner 127 can access a database or another system to retrieve the base input data.

In some implementations, the base input data may be a web content, public news, etc., that can be obtained from a publicly available large dataset(s), e.g., Common Crawl and Leipzig corpora, e.g., first public data.

Common Crawl is an open repository of data accumulated by crawling the web, as known to those skilled in the art. Common Crawl is a massive non-curated dataset of webpages in many languages, mixed together in temporal snapshots of the web. Every month, Common Crawl releases a snapshot of the web obtained by randomly exploring and sampling URLs. Presently, the complete archive consists of petabytes of data collected over many years of web crawling. The webpages are crawled from the whole web without restriction; they come in many different languages and the quality of the text varies greatly.

The Leipzig Corpora Collection presents corpora in different languages using the same format and comparable sources. All data are available as plain text files and can be imported into a MySQL database by using the provided import script. The data are intended both for scientific use by corpus linguists as well as for applications such as knowledge extraction programs. The corpora are identical in format and similar in size and content, and contain randomly selected sentences in the language of the corpus and are available in sizes from 10,000 sentences up to 1 million sentences. The sources are either newspaper texts or texts randomly collected from the web.

However, this is not intended to be limiting, and, in some implementations, the base input data may be obtained from other source or sources or may be a mix of data from Common Crawl, Leipzig Corpora Collection, and other sources.

In some implementations, the data miner 127 may include a language detector 128. A user may provide, through the UI subsystem 106, an input for identifying a target language to be processed by the natural language generation system 98, where the base vocabulary generation subsystem 122 can be tasked to generate the base vocabulary 123 for the target language provided by the user input and English.

In an example, the user input identifies Spanish as the target language to be processed by the natural language generation system 98.

The language detector 128 may receive, as the base input data, the web content, and identify the language of the web content, to select content in English and Spanish. As an example, the language detector 128 may use a language detecting model, e.g., a classification model, which provides an identification of the languages. In some embodiments, the language detector 128 may associate a language identifier (ID) with the webpage or a portion of the content and sort the input data into datasets corresponding to certain languages, e.g., Spanish and English.

The base vocabulary generation subsystem 122 is configured to receive, as an input, the input data from the language detector 128, and perform the processing that results in a generation of the base vocabulary 123. The base vocabulary 123 generated by the base vocabulary generation subsystem 122 then used as an input for the preparatory processing stage performed by the base model generation subsystem 112.

In certain implementations, the base vocabulary generation subsystem 122 includes a first tokenizer 129. The first tokenizer 129 tokenizes the input data received from the data miner 127 into tokens, e.g., words. For example, the first tokenizer 129 uses one or more neural network models to process the input data of one or more languages. In the process of tokenizing the input data, the first tokenizer 129 may remove language-specific stop words and maintain a counter of the most used vocabulary in both languages, e.g., Spanish and English.

In certain implementations, the base vocabulary generation subsystem 122 can further include a vocabulary selector 130. In an embodiment, the vocabulary selector 130 may select words used with most frequency in both languages for further processing.

For example, the vocabulary selector 130 may receive, through the UI subsystem 106, a user input for selecting a number of words to be used for a target language, e.g., Spanish, and a number of words to be used for English. As a non-limiting example, the vocabulary selector 130 may select from 50,000 to 60,000 words for the target language and from 25,000 to 30,000 words for English. Such selection can provide a total of around 70,000-80,000 vocabulary words for training of a base model. The 50,000 to 60,000 words of the target language and 25,000 to 30,000 words for English were determined based on the experiments and capture about 99% of all the words in each of the languages.

In certain implementations, the base vocabulary generation subsystem 122 may perform count vectorization of each word to construct a high-frequency word base vocabulary.

In an embodiment, the input data that is processed by the base vocabulary generation subsystem 122 may be stored in the base vocabulary 123. As shown in an embodiment of FIG. 1B, the data may be grouped in the datasets by language. For example, the input data that is processed by the base vocabulary generation subsystem 122 according to English and Spanish (e.g., the target language) may be stored as a first dataset 132 and a second dataset 133, respectively.

Similarly to what is described above, the base vocabulary generation subsystem 122 may generate a third dataset for another target language, e.g., Portuguese, etc. The third dataset may be stored in the storage subsystem. When the user input indicates to perform the processing for another target language, e.g., to generate the base model for another target language, the third dataset may be combined with the first dataset 132 to serve as the base vocabulary 123.

As mentioned above, the base vocabulary 123 generated by the base vocabulary generation subsystem 122 may be used by the model training subsystem 100 in the generation of the base model 148. The base model may be further trained to develop various model(s) for different use cases or new use cases at the first training stage and/or the second training stage.

B. Base Model Generation

With continuing reference to FIG. 1A and reference again to FIG. 1C, the base model generation subsystem 112 is configured to perform processing that results in the generation of the base model 148. The base model generation subsystem 112 receives, as an input, an input model 113 of a desired architecture. The base model generation subsystem 112 then performs processing on the input model 113 that results in the generation of the base model 148 that is output by the base model generation subsystem 112. The output base model 148 is then used as an input for the further training performed by the custom model generation subsystem 114.

In some implementations, the input model 113 may be a machine learning model.

As used herein, a "machine learning model" or a "model" can refer to a software module configured to be run on one or more processors to provide a classification or numerical value of a property of one or more samples. An example type of model is supervised learning that can be used with embodiments of the present disclosure. Example supervised learning models may include different approaches and algorithms including analytical learning, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, statistical relational learning, or Proaftn, a multicriteria classification algorithm.

The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DB-SCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

In some embodiments, the machine learning models could include, but not limited to, convolutional neural network (CNN), linear regression, logistic regression, deep recurrent neural network (e.g., fully-connected recurrent neural network (RNN), Gated Recurrent Unit (GRU), long short-term memory, (LSTM)), transformed-based methods (e.g. XLNet, BERT, XLM, RoBERTa), Bayes' classifier, hidden Markov model (HMM), linear discriminant analysis (LDA), k-means clustering, density-based spatial clustering of applications with noise (DBSCAN), random forest algorithm, adaptive boosting (AdaBoost), eXtreme Gradient Boosting (XGBoost), support vector machine (SVM), or a composite model including one or more models proposed above.

In certain implementations, the architecture of the input model 113 may be one of the architectures known to those skilled in the relevant art as being appropriate for the task. For example, a transformer-based architectures may be used for natural language processing (NLP) tasks.

1. mT5 Model

In some embodiments, the input model 113 may be based on a multilingual text-to-text transformer (mT5) model that is pretrained on a massively multilingual common crawl-based text corpus (mC4) containing text from over 100 different languages. However, this is not intended to be limiting.

FIG. 4A shows an exemplary architecture of mT5 model 400, according to some embodiments. For example, the input model 113 may be the mT5 model 400.

T5 model is a pretrained language model that uses a unified "text-to-text" format for all text based NLP problems. The architecture of the mT5 model is based on T5 and is designed to support any Natural Language Processing task, e.g., classification, named entity recognition (NER), question answering, etc. The example of the tasks performed by T5 are generative tasks (such as machine translation or abstractive summarization) where the task format requires the model to generate text conditioned on some input, and classification tasks where T5 model is trained to output the literal text of the label (e.g., "positive" or "negative" for sentiment analysis).

T5 model uses a basic encoder-decoder transformer architecture, known to those skilled in the relevant art. T5 model is pretrained on a masked language modeling "span-corruption" objective, where consecutive spans of input tokens are replaced with a mask token and the model is trained to reconstruct the masked-out tokens. The pretrained model sizes are from 60 million to 11 billion parameters. These models are pretrained on around 1 trillion tokens of data. Unlabeled data comes from the C4 dataset, which is a collection of about 750 GB of English-language text sourced from the public Common Crawl web scrape. C4 includes heuristics to extract only natural language (as opposed to boilerplate and other gibberish) in addition to extensive deduplication.

The mT5 model is designed to follow T5 model as closely as possible and inherits all of the benefits of T5 model, such as its general-purpose text-to-text format, its design based on insights from a large-scale empirical study, and its scale. The mT5 model is trained on a multilingual variant of the C4 dataset (mC4) that includes natural text in over 100 languages drawn from the public Common Crawl web scrape. However, the mT5 model is not fine-tuned for downstream tasks, e.g., use cases such as entity recognition, sentiment analysis, etc.

As shown in FIG. 4A, the mT5 model 400 includes an encoder part 401 and a decoder part 402, as the components of a transformer model. First, an input sentence is tokenized into distinct elements, e.g., tokens. These tokens are typically integer indices in a vocabulary dataset. To feed those tokens into the neural network, each token is converted into an embedding vector by an input embedding layer 403. Further, a positional encoding layer 404, e.g., a linear encoding layer, is provided and injects positional encoding into each embedding so that the model can know word positions without recurrence. The outputs of the input embedding layer 403 and the positional encoding layer 404 are combined and passed on to a multi-head attention layer 406 of the encoder part 401. Thus, an input to the transformer is not the characters of the input text but a sequence of embedding vectors. Each vector represents the semantics and position of a token.

The output of the encoder part 401 is provided as an input to the decoder part 402 that generates an output sequence, e.g., an output vector. Then, the output vector from the decoder part 402 goes through a linear transformation layer 410 that changes the dimension of the vector from the embedding vector size into the size of vocabulary. The softmax layer 420 further converts the vector into probabilities that are then provided as an output of the mT5 model 400. E.g., an output of the mT5 model 400 are probabilities associated with the words distributed within 100+ languages.

2. Modified mT5 Model

With reference again to FIGS. 1A and 1C, the base model generation subsystem 112 uses the input model 113 and the base vocabulary 123, e.g., the first dataset 132 (e.g., English) and the second dataset 133 (e.g., Spanish), to generate the base model 148 with constrained, e.g., restricted, vocabulary. The input model 113 may be based on a modified architecture of the mT5 model 400.

In some implementations, the base model generation subsystem 112 may include a base model preparation subsystem 154 and a base model training subsystem 156. The base model preparation subsystem 154 can modify the architecture of the mT5 model 400, e.g., of the input model 113. The base model training subsystem 156 can perform processing using the modified architecture of the mT5 model 400 that results in the generation of the base model 148.

Figure 4B:
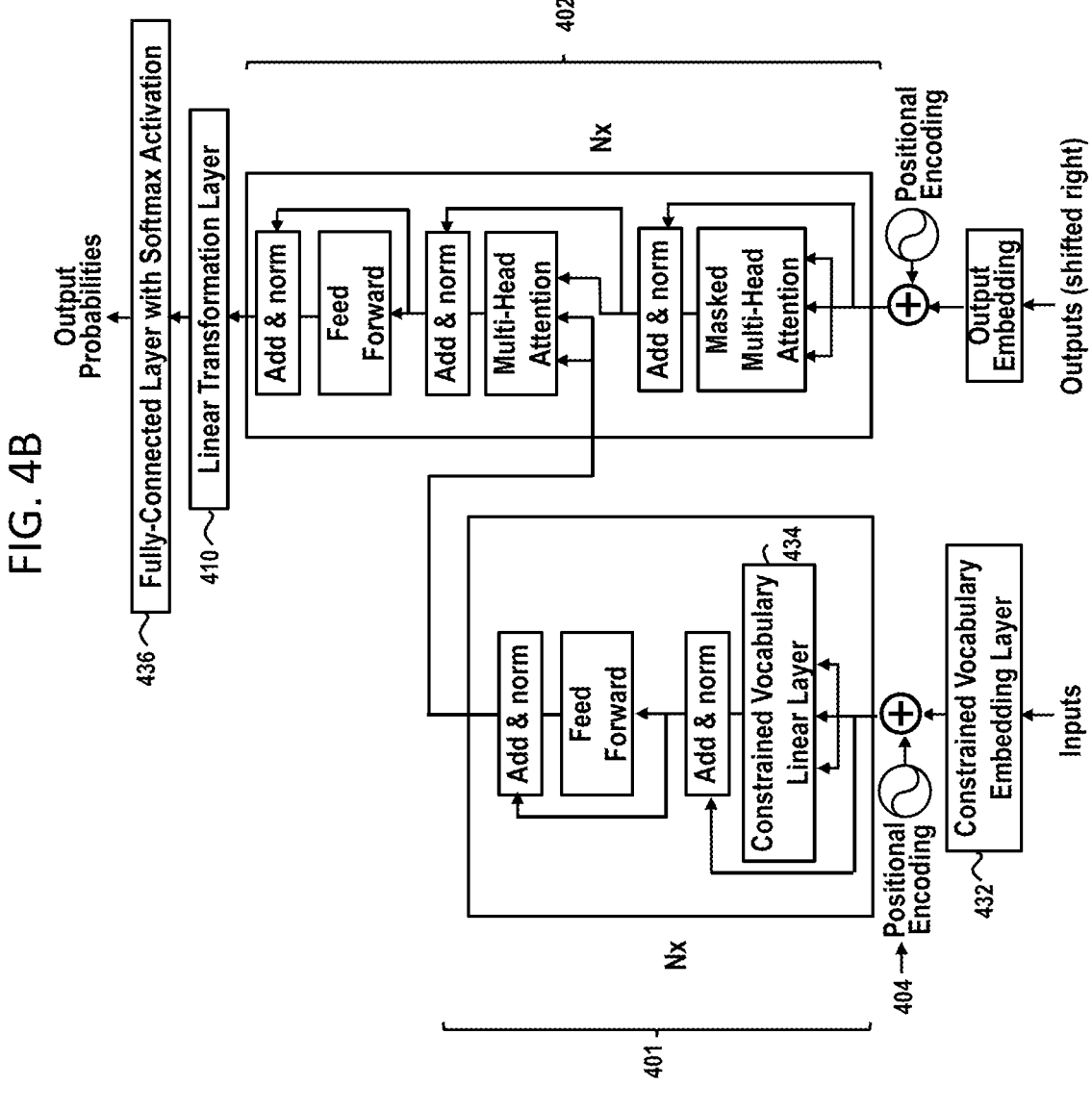
FIG. 4B illustrates an example of a modified mT5 model according to various embodiments.

FIG. 4B shows a modified architecture of the mT5 model 400. For example, the base model 148 may be of an architecture corresponding to a modified mT5 model 430. The base model preparation subsystem 154 modifies the architecture of the mT5 model 400 by inserting two new layers as an input to a core of the mT5 model, e.g., as a replacement for the input embedding layer 403 and the multi-head attention layer 406. For example, two additional layers are a constrained vocabulary embedding layer 432, e.g., an embedding layer with a desired vocabulary length input, and a constrained vocabulary linear layer 434, e.g., a linear multi-head attention layer with desired vocabulary length output. For example, the input of the constrained vocabulary embedding layer 432 and the output of the constrained vocabulary linear layer 434 may be equal to the length of the desired vocabulary, e.g., 70,000 to 80,000 words selected by the base vocabulary generation subsystem 122 to be included in the base vocabulary 123.

The base model training subsystem 156 uses the indexes of the base vocabulary 123 generated by the base vocabulary generation subsystem 122 and prunes all the remaining input embeddings that the mT5 model has been trained on. E.g., by modifying the mT5 model to include the constrained vocabulary embedding layer 432 and the constrained vocabulary linear layer 434, the mT5 model is constrained to the knowledge needed for the target language and English and all other languages are pruned from the model.

In some implementations, the base model preparation subsystem 154 may further modify the architecture of the mT5 model 400 by replacing the softmax layer 420 with a fully-connected layer with softmax activation 436 that receives an output of the decoder part 402. An output of the base model 148 are probabilities associated with the words distributed within the target language and English.

As a result of the processing performed by the base model preparation subsystem 154 and the base model training subsystem 156, a bilingual model with constrained vocabulary is obtained as the base model 148 and has the capability of understanding the target language and English. Additionally, the processing is performed such that already learned sentence embeddings of the mT5 model are maintained in the trained base model 148 and can be fine-tuned in further training, e.g., during the generation of the custom models 153.

The base model 148 may be stored in the storage subsystem 104.

The above-described processing allows decreasing the size of the input model 113, as compared to the mT5 model, by decreasing the vocabulary from 250,000 words to about 70,000 to 80,000 words. This represents a 77% decrease on average that was proved by performing the same experiment for two different target languages (Spanish and Portuguese). Also, the base model of a reduced size of 32% on an average was obtained, in comparison to the mT5 model.

When the model size is bigger, the inference speed is very slow. Accordingly, with a smaller model, the embodiments achieve the very high inference speed, for custom models 153 and refined models 188 that are developed by training the base model.

A number of bilingual base models for given target languages may be generated and stored for future use, using the techniques described above. For example, similarly to what is described above, another base model may be generated for another target language, e.g., Portuguese, and stored in the storage subsystem 104.

As mentioned above, the base model 148 may be further trained using enhanced training datasets, to develop bilingual custom models 153 corresponding to the target language and English.

C. First Training Stage

With reference again to FIGS. 1A to 1C, the training data generation subsystem 102 may receive, as an input, enhanced input data from a public text source and perform the processing on the enhanced input data that results in a generation of the enhanced training datasets 125. As a non-limiting example, in an embodiment, the training data generation subsystem 102 generates the enhanced training datasets 125 for two languages where one language is English and other language is the target language, e.g., Spanish. The enhanced training datasets 125 generated by the training data generation subsystem 102 then can be used as an input for the first training stage performed by the custom model generation subsystem 114, in the training of the base model 148.

In embodiments, the training of the model is performed using a training dataset and involves iterative operations to find a set of parameters for the model, which is being trained, that minimizes a loss or error function. Each iteration includes finding the set of parameters for the model so that a value of the loss or error function using the set of parameters is smaller than a value of the loss or error function using another set of parameters in a previous iteration. The loss or error function is configured to measure a difference between outputs inferred by the model for the inputs in the training dataset and the outputs that are predetermined for these inputs. Once an optimal set of parameters is determined, the model is considered to be trained for a corresponding task. The training of the models is described in a greater detail below with reference to FIG. 5.

As a result of the first training stage, the base model will learn to perform specific tasks using the public data. More specifically, in the first training stage, the base model will learn (i) to generate text based on the keyword; (ii) summarize text; and (iii) generate a next sentence that is continually coherent with the previously generated text and includes given keywords.

In embodiments, the custom model generation subsystem 114 is configured to obtain, as an input, the base model 148, and perform training on the base model 148 using the enhanced training datasets 125 that correspond to the first training stage. The first training stage may have one or more training sub-stages to incorporate use cases, where the base model 148, e.g., a bilingual model, that is obtained at the preparatory processing stage is trained at each training sub-stage with respect to the use case. The output of the first training stage is one or more custom models 153 that learned to perform various tasks as described below.

In certain implementations, the custom model generation subsystem 114 may include a custom model training subsystem 134 configured to train the base model 148 using one or more enhanced training datasets 125 at multiple training sub-stages.

For example, at a first training sub-stage, the custom model training subsystem 134 can train the base model 148 using a first enhanced training dataset, to generate a first custom model. The first custom model may be a Desired Language Text Summarization Model (DLTSM). The DLTSM can be referred to as a text summarization model. For example, the DLTSM can receive as an input text for any given language and provide a summary of the text as an output. The described techniques generate a text summarization model that can be used to summarize any domain multi-lingual text. The approach can be used for many summarization tasks, e.g., text summarization, SOAP Note Generation, etc. The SOAP note is a method that is commonly used by clinicians to document their patients' health.

At a second training sub-stage, the custom model training subsystem 134 can train the base model 148 using a second enhanced training dataset, to generate a second custom model. The second custom model may be a Keyword-based Text Generation Model (KBTGM). The KBTGM can be referred to as a text generation model. The objective of this model is to accept one or more keywords as an input and output one or more sentences where these keywords are present.

At a third training sub-stage, the custom model training subsystem 134 can train the base model 148 using a third enhanced training dataset to generate a third custom model. The third custom model may be a Multi-Keyword and Summary-Based Next Sentence Generation Model (MKSNSGM). The MKSNSGM can be referred to as a next sentence generation model. The objective of this model is to generate a next sentence based on the summary provided by the DLTSM and the certain keywords provided as an input. E.g., the MKSNSGM may be tasked with predicting a next sentence that follows the given summary based on the given keywords.

The generation of the enhanced training datasets 125 and processes involving each of the training sub-stages mentioned above are described in detail below.

1. First Enhanced Training Dataset Generation

With continuing reference to FIG. 1B, as mentioned above, the training data generation subsystem 102 receives, as an input, enhanced input data from a public text source and performs the processing on the enhanced input data that results in the generation of the enhanced training datasets 125.

As described above, the training data generation subsystem 102 may include the data miner 127. The data miner 127 can obtain or receive the enhanced input data, e.g., the article-summary pairs, and perform certain processing on the enhanced input data, to output data in one or more languages, e.g., in a target language and English. For example, the data miner 127 can access a database or another system to retrieve the enhanced input data.

In some implementations, the enhanced input data may be a web content from one or more publicly available datasets. As an example, the enhanced input data is obtained from XLSum and WikiLingua (e.g., second public data) that contain annotated article-summary pairs in about 50 languages.

For example, the language detector 128 may receive, as the enhanced input data, the article-summary pairs and identify the language of the article-summary pairs, to select web content in English and Spanish. The operation of the language detector 128 is described above.

In some embodiments, as a result of the processing performed by the language detector 128, the article-summary pairs in the target language may be selected. The article-summary pairs may be identified by the language ID and/or grouped by the language and stored, e.g., in the storage sub system 104.

In certain implementations, the enhanced training dataset generation subsystem 124 includes a first filter 136. The first filter 136 receives the article-summary pairs from the language detector 128 and filters the article-summary pairs based on one or more predetermined criteria.

In some embodiments, the first filter 136 may filter the article-summary pairs based on a number of words in the article and group the article-summary pairs based on the number of words in the article. For example, the first filter 136 may group the article-summary pairs having articles with the number of words in a range of 100 to 2000 words into a first group, group the article-summary pairs having articles with the number of words in a range of 2001 to 3500 words into a second group, and group the article-summary pairs having articles with the number of words in a range of 3501 to 5000 words into a third group. Further, the first filter 136 may discard the article-summary pairs having articles with the number of words more than 5000.

In some embodiments, the first filter 136 may receive, through the UI subsystem 106, a user input for specifying the criteria of filtering and grouping the article-summary pairs. In other embodiments, the criteria may be preconfigured.

The enhanced training dataset generation subsystem 124 can further include an article-summary pair selector 137. The article-summary pair selector 137 receives, from the first filter 136, first to third groups of the article-summary pairs and selects a certain number of the article-summary pairs from each group, for example, based on the total number of the article-summary pairs output by the first filter 136.

As a non-limiting example, the article-summary pair selector 137 may select, from the first group, the article-summary pairs having articles with 100 to 2000 words to be about 60% of total number of the article-summary pairs, select, from the second group, the article-summary pairs having articles with 2001 to 3500 words to be about 25% of total number of the article-summary pairs, and select, from the third group, the article-summary pairs having articles with 3501 to 5000 words to be about 15% of total number of the article-summary pairs. For example, the article-summary pair selector 137 selects the article-summary pairs from each group randomly.

In some embodiments, the article-summary pair selector 137 may receive, through the UI subsystem 106, a user input for specifying the quantity of the article-summary pairs to be selected from each group. In other embodiments, the quantity of the article-summary pairs to be selected from each group may be preconfigured.

As a result of the processing performed by the first filter 136 and the article-summary pair selector 137, a distribution that contains sentences of the articles having certain lengths is formed, as an article-summary pairs dataset 138, e.g., the first enhanced training dataset. In some embodiments, the article-summary pairs dataset 138 may be stored in the storage subsystem 104, as shown in FIG. 1C.

Below, for an example of the target language being Spanish, a format of the data of the article-summary pairs dataset 138 is shown in Table 1:

TABLE 1

| Article | Summary |
|---|---|
| Manifestantes hindúes gritan consignas contra el gobierno en la región de Cachemira administrada por India. Las manifestaciones tuvieron lugar después de los rezos especiales Eid, en la ciudad de Srinagar y en diversas ciudades de la región. La policía dice que la respuesta se produjo cuando la muchedumbre se volvió violenta y empezó a lanzarles palos y piedras. Varios policías y manifestantes resultaron heridos. El jueves a la noche diversos líderes separatistas fueron arrestados para evitar que lideraran las protestas. | La policía en la región de Cachemira administrada por India, lanzó gas lacrimógeno y disparó balas de goma para dispersar una protesa contra supuestas violaciones de los derechos humanos llevadas a cabo por las fuerzas del gobierno. |

TABLE 1-continued

| Article | Summary |
|---|---|
| McDonald's restaba importancia a las protestas por subida de salarios. La cadena de hamburgueserías le dijo a los reguladores financieros estadounidenses que las campañas en redes sociales y la amenaza de boicots y huelgas podría afectar a su negocio. McDonald's y otras compañías de comida rápida habían restado importancia al impacto de las protestas por parte de trabajadores demandando subidas de salarios. En diciembre, los trabajadores de comida rápida en cien ciudades de EE.UU. organizaron huelgas para demandar una subida del salario mínimo. | El gigante de la alimentación McDonald's reconoció que la preocupación pública sobre la desigualdad de renta podría forzar a subir los salarios que paga en Estados Unidos. |

2. DLTSM Generation

With reference again to FIG. 1C, as mentioned above, at the first training sub-stage, the custom model generation subsystem 114 can generate a DLTSM 164, e.g., the first custom model that is the text summarization model. In some embodiments, the custom model generation subsystem 114 may include a DLTSM generator 166. The DLTSM generator 166 receives the base model 148 as an input and trains the base model 148 using the article-summary pairs dataset 138, e.g., the first enhanced training dataset. In the training performed at the first training sub-stage, the articles from the article-summary pairs dataset 138 are provided as inputs to the base model 148 that is tasked with outputting summaries corresponding to the articles of the article-summary pairs.

As a result of the training performed by the DLTSM generator 166, the custom model training subsystem 134 generates and outputs the DLTSM 164. The DLTSM 164 is a bilingual model that is capable of receiving, as an input, an article and outputting a summary of the article.

In some embodiments, the DLTSM 164 may be stored in the storage subsystem 104, as shown in FIG. 1B.

3. Second Enhanced Training Dataset Generation

With reference again to FIG. 1B, in certain implementations, the enhanced training dataset generation subsystem 124 may further include a keyword-text pairs generator 139. The keyword-text pairs generator 139 may include a keyword extractor 140 configured to extract keywords using the article-summary pairs dataset 138.

For example, the keyword extractor 140 may extract keywords using a machine learning model, e.g., a keyword extracting model 141. In some embodiments, the keyword extracting model 141 is Language Agnostic BERT Sentence Embedding (LAB SE) model that has the capability of generating embeddings for over 100 different languages. For the text in any language that is provided as an input to the LAB SE model, the LAB SE model can generate embeddings for each particular sentence.

The keyword extractor 140 obtains the text, e.g., sentences of the articles, from article-summary pairs dataset 138, and provides the text, as an input, to the keyword extracting model 141. The keyword extracting model 141, e.g., LABSE, generates LAB SE embeddings for each input sentence. The keyword extractor 140 controls keyword extraction using LAB SE embeddings with a probability that varies based on the lengths of sentences of the obtained text. For example, the given sentence is sampled by the number of words included in the sentence and the following processing is performed:

1. If the length of the sentence is less than 500 words, uniform probability distribution of choosing ngrams in the range of 1 to 6 along with a combination of choosing the number of such ngrams to be detected in the range of 1 to 3.

2. If length of the sentence is in between 500 to 2000 words, ngrams range is considered to be between 2 to 6 with a total number of such ngrams is between 5 to 9.

3. If the length of the sentence is between 2001 to 5000, ngrams range is considered to be between 2 to 6 with a total number of such ngrams between 10 to 17.

To further enhance the quality of keywords being extracted, the keyword extractor 140 applies a Maximal Marginal relevance (MMR) algorithm 142 to the extracted keywords. The MMR algorithm 142 is tasked with minimizing the redundancy and maximizing the diversity of results. For example, the MMR algorithm 142 considers the similarity of keywords/key phrases within the document, along with the similarity of already selected keywords and key phrases. That is, the keyword extractor 140 uses an inherent capability of the LAB SE embeddings to capture the most important keywords and then uses the MMR algorithm 142 that acts as a metric to find the relevant keywords among the extracted keywords. This results in a selection of keywords that maximize their diversity with respect to the document, e.g., the selection of relevant keywords. This is useful for identifying those keywords in the text that contribute maximum to the sentence formation, e.g., that are vital to the sentence formation.

As a result of the processing performed by the keyword extractor 140, a keyword-text pairs dataset 143, e.g., the second enhanced training dataset, is obtained. The keyword-text pairs dataset 143 includes the relevant keywords and text corresponding to the relevant keywords. In some embodiments, the keyword-text pairs dataset 143 may be stored in the storage subsystem 104, as shown in FIG. 1C.

Below, for an example of the target language being Spanish, a format of the data of the keyword-text pairs dataset 143 is shown in Table 2:

TABLE 2

| Keyword(s) | Text |
|---|---|
| ['proteger los sirios'] | De no recibir más dinero, las raciones de la ONU en Siria se terminarán en dos meses. En un informe al Consejo de Seguridad de la ONU, Amos dijo que las raciones del PMA destinadas a los 4.000.000 de sirios ya han sido |

TABLE 2-continued

| Keyword(s) | Text |
| --- | --- |
| | recortadas para poder llegar a la mayor cantidad de personas posible. Amos también hizo un llamado a juntar suministros para proteger los sirios del frío, en miras al próximo invierno. |
| ['Manifestantes hindúes gritan', 'región de Cachemira', 'Srinagar en diversas'] | Manifestantes hindúes gritan consignas contra el gobierno en la región de Cachemira administrada por India. Las manifestaciones tuvieron lugar después de los rezos especiales Eid, en la ciudad de Srinagar en diversas ciudades de la región. La policía dice que la respuesta se produjo cuando la muchedumbre se volvió violenta y empezó a lanzarles palos y piedras. Varios policías y manifestantes resultaron heridos. El jueves a la noche diversos líderes separatistas fueron arrestados para evitar que lideraran las protestas. |

The keyword may contain one or more words, e.g., a keyword string or phrase. Further, more than one keyword string may be extracted from a portion of text. As used herein, the keyword string is referred to as entity. In Table 2, the first row contains one entity, and the second row contains three entities.

4. KBTGM Generation

With reference again to FIG. 1C, at the second training sub-stage, the custom model generation subsystem 114 generates a KBTGM 161, e.g., a second custom model that is the text generation model. In some embodiments, the custom model generation subsystem 114 may include an KBTGM generator 162 that receives the base model 148, as an input, and trains the base model 148 using the keyword-text pairs dataset 143, e.g., the second enhanced training dataset. During the training performed at the second training sub-stage, the keywords from the keyword-text pairs dataset 143 are passed as inputs to the base model 148. The base model 148 is then tasked with outputting the text corresponding to the keywords of the keyword-text pairs.

As a result of the training performed by the KBTGM generator 162, the custom model training subsystem 134 generates and outputs the KBTGM 161. The KBTGM 161 is a bilingual model that is capable of receiving, as an input, one or more keywords, and outputting text, e.g., one or more sentences, where these keywords are present.

5. Third Enhanced Training Dataset Generation

With continuing reference to FIG. 1C and referring again to FIG. 1B, in certain implementations, the enhanced training dataset generation subsystem 124 may further include a Summary Text-MultiKeyword-Next Sentence (STMKNS) triplet generation subsystem 168 that is used in generating an MKSNSGM 169, e.g., the third custom model. The STMKNS triplet generation subsystem 168 receives, as an input, the keyword-text pairs from the keyword-text pairs dataset 143 and uses the keyword-text pairs and the DLTSM 164 to generate an STMKNS triplets dataset 170.

For example, the STMKNS triplet generation subsystem 168 may include a second filter 172. The second filter 172 is configured to obtain, as an input, the keyword-text pairs from the keyword-text pairs dataset 143. The second filter 172 then detects a number of entities in the keyword-text pairs. In some embodiments, the second filter 172 may filter out one entity based keyword-text pairs, e.g., the keyword-text pairs having only one entity, to exclude the one entity based keyword-text pairs from further processing performed by the STMKNS triplet generation subsystem 168. The second filter 172 may also perform grouping of the keyword-text pairs having more than one entity. For instance, the second filter 172 can group the keyword-text pairs having a number of entities greater than or equal to 2 and fewer than 5 into a first group, and group the keyword-text pairs having a number of entities equal to or greater than 5 into a second group.

The STMKNS triplet generation subsystem 168 can further include a second tokenizer 174. For the keyword-text pairs of the first group having a number of entities greater than or equal to 2 and fewer than 5, the second tokenizer 174 tokenizes the entire paragraph, e.g., divides the paragraph into sentences. However, this is not intended to be limiting. For example, the second tokenizer 174 applies a similar processing to the paragraphs of the keyword-text pairs included in the second group.

The DLTSM 164 receives, as an input, one or more tokenized paragraphs from the second tokenizer 174, and recursively calculates the summaries for the sentences of the paragraph that has at least 1 entity from the starting position, e.g., where a first sentence includes an entity.

The STMKNS triplet generation subsystem 168 can further include a next sentence generator 176 that controls a recursive calculation of the next sentence using the tokenized sentences and entities included in the sentences, e.g., the keywords. The next sentence generator 176 can perform the recursive calculation of the next sentence differently for the keyword-text pairs of the first group and the keyword-text pairs of the second group.

In an example, the second tokenizer 174 may tokenize the paragraph of one of the keyword-text pairs of the first group into five sentences, where five sentences have four entities:

Sentence 1 includes entity 1
Sentence 2 includes entity 2
Sentence 3 includes entity 3
Sentence 4 does not include entity
Sentence 5 includes entity 4

Based on the above example, the STMKNS triplets dataset 170 may be prepared in multiple iterations, as described below.

In the first iteration, the next sentence generator 176 selects sentence 1 as an input, e.g., sentence 1 is not summarized. The next sentence generator 176 selects sentences 2 to 5 as an output, e.g., the next sentences, to be associated with sentence 1. The keywords associated with the input will be entities 2, 3, and 4, e.g., entity values.

In the second iteration, the next sentence generator 176 selects sentences 1 and 2 and provides these sentences to the DLTSM 164. The DLTSM 164 then can output a summary of sentences 1 and 2. The next sentence generator 176 selects the summary of the sentences 1 and 2 as an input, and sentences 3 to 5 as an output, e.g., as the next sentences, where the keywords associated with the input will be entities 3 and 4.

In the third iteration, the next sentence generator 176 selects sentences 1 to 3 and provides these sentences to the DLTSM 164. The DLTSM 164 then can output a summary of sentences 1 to 3. The next sentence generator 176 selects the summary sentences of the sentences 1 to 3 as an input, and sentences 4 to 5 as an output, e.g., as the next sentences, where the keyword associated with the input will be entity 4.

The processing for the keyword-text pairs of the second group is performed in a similar manner, except that instead of considering every entity each time, two entities are considered at a time. Similarly to what is described above, the sentence having the first entity is not summarized.

As a result of the processing performed by the STMKNS triplet generation subsystem 168, an STMKNS triplets dataset 170 is obtained.

Below, for an example of the target language being Spanish, a format of the data of the STMKNS triplets dataset 170 is shown in Table 3:

In some embodiments, the MKSNSGM 169 may be stored in the storage subsystem 104.

In certain implementations, at least some of the custom models 153 generated by the custom model generation subsystem 114 may then be further fine-tuned for one or more specific use cases using the refined training datasets 131, as described below.

C. Second Training Stage

With reference again to FIGS. 1A to 1C, the training data generation subsystem 102 may receive, as an input, data containing private content ("private data") and perform the processing on the data containing private content that results in a generation of the refined training datasets 131. The refined training datasets 131 generated by the training data generation subsystem 102 then can be used as an input for the second training stage performed by the refined model

TABLE 3

| Summary Text | Multi-Keyword | Next Sentence(s) |
|---|---|---|
| El paquete de correo electrónico que envié a mi esposa, luna, llegó el pasado miércoles y se encuentra en la puerta de su casa. | ['213195492566790', 'Semana Santa'] | Tuvimos la información incorrecta en la tarjeta de crédito, se clasificó como 213195492566790. Lo cambiaré tan pronto como sea posible y debería recibir su paquete antes de Semana Santa! |
| El figueroa, uno de los principales equipos de fútbol de estados unidos, se encuentra en la ciudad de los ángeles, ee.uu., en el norte del país. | ['4056271351398942679', 'Feria de Sevilla', 'Ciudad, Cádiz, Trinidad y Tabago, 26474'] | Su tarjeta de crédito que termina en 4056271351398942679 parece haberse visto comprometida en Feria de Sevilla. Hemos cancelado esta tarjeta inmediatamente y enviaremos una nueva a Ciudad, Cádiz, Trinidad y Tabago, 26474. Lo siento por los inconvenientes, pero pronto estará en camino. |

In Table 3, column 1 shows a summary text obtained by the DLTSM 164 from the sentences selected from the tokenized paragraph by the next sentence generator 176. Column 2 shows entities, e.g., keywords, present in the remaining, e.g., unselected, sentences of the tokenized paragraph. Column 3 shows the unselected sentences having the entities of column 2, e.g., the next sentences.

In some embodiments, the STMKNS triplets dataset 170 may be stored in the storage subsystem 104, as shown in FIG. 1C, and/or provided to the custom model training subsystem 134, to generate the MKSNSGM 169 at the third sub-stage of the first training stage.

6. MKSNSGM Generation

With continuing reference to FIG. 1C, the custom model training subsystem 134 can train the base model 148 using the STMKNS triplets dataset 170, to generate the MKSNSGM 169, e.g., a third custom model that is a next sentence generation model, which can predict a next sentence that follows the given summary based on the given keywords.

The custom model generation subsystem 114 may include an MKSNSGM generator 178. The MKSNSGM generator 178 receives the base model 148, as an input, and trains the base model 148 using the STMKNS triplets dataset 170, e.g., the third enhanced training dataset. As a result of the training performed by the MKSNSGM generator 178, the custom model training subsystem 134 outputs the MKSNSGM 169, e.g., the third custom model. The MKSNSGM 169 is a bilingual model that is capable of receiving, as an input, multiple keywords and a summary, and outputting the next sentence prediction based on the keywords and the summary, where the next sentence includes the keywords.

generation subsystem 118 in training the custom models 153 to generate the refined models 188.

In embodiments, the training of the model is performed using a training dataset and involves iterative operations to find a set of parameters for the model, which is being trained, that minimizes a loss or error function. Each iteration includes finding the set of parameters for the model so that a value of the loss or error function using the set of parameters is smaller than a value of the loss or error function using another set of parameters in a previous iteration. The loss or error function is configured to measure a difference between outputs inferred by the model for the inputs in the training dataset and the outputs that are predetermined for these inputs. Once an optimal set of parameters is determined, the model is considered to be trained for a corresponding task. The training of the models is described in a greater detail below with reference to FIG. 5.

As a result of the second training stage, the custom models 153 will learn to perform specific tasks on the private data, e.g., PII entity data, key processing entity (KPE) data, protected health information (PHI) data, etc. More specifically, for an example of the PII entity data, in the second training stage, the custom models will learn (i) to generate text based on the entity value corresponding to PII entity, and (ii) generate a next sentence that is continually coherent with the previously generated text and includes given keywords, e.g., entity values corresponding to the PII entities.

1. First Refined Training Dataset Generation

With continuing reference to FIG. 1B, as mentioned above, the training data generation subsystem 102 may include the refined training dataset generation subsystem 126. The refined training dataset generation subsystem 126 may receive, as an input, a seed dataset 179 generated based on the private data. For example, the seed dataset 179 may contain data in English. The refined training dataset generation subsystem 126 may perform processing on the seed dataset 179 that results in a generation of the refined training datasets 131. The refined training datasets 131 generated by the refined training dataset generation subsystem 126 then can be used as an input for the second training stage performed by the refined model generation subsystem 118.

In some implementations, the private data may include PII entities. PII is any representation of information that permits the identity of an individual to whom the information applies to be reasonably inferred by either direct or indirect means. Further, PII may be defined as information: (i) that directly identifies an individual (e.g., name, address, social security number or other identifying number or code, telephone number, email address, etc.) or (ii) by which an agency intends to identify specific individuals in conjunction with other data elements, i.e., indirect identification. These data elements may include a combination of gender, race, birth date, geographic indicator, and other descriptors. Additionally, information permitting the physical or online contact of a specific individual is the same as the PII.

Since PII data is limited due to its confidentiality, the initial dataset is prepared from few samples containing private data, e.g., 400, based on the annotated data in English. For example, the refined training dataset generation subsystem 126 can access a database or another system to retrieve the private data. As another example, the private data may be prestored in the storage sub system 104.

Then, the seed dataset 179 is prepared by enhancing the initial dataset using various augmentation techniques to arrive at approximately 8,000 samples. For example, the seed dataset 179 may be stored in the storage subsystem 104.

In some embodiments, the refined training dataset generation subsystem 126 may include a primary data generator 177 that can obtain, as an input, the seed dataset 179. For example, the primary data generator 177 may perform processing on the seed dataset 179 that results in the generation of the primary data 186, e.g., the first refined training dataset, in the target language. The primary data 186 can then be used as an input for the second training stage performed by the refined model generation subsystem 118.

The PII data may be maintained in paper, electronic, or other media. Sensitive PII, if lost, compromised, or disclosed without authorization, could result in harm, embarrassment, inconvenience, or unfairness to an individual. Consequently, there are numerous safeguards in place to obscure or remove PII from the public domain.

Accordingly, in some embodiments, the primary data generator 177 includes an obscured private data preparation subsystem 180. The obscured private data preparation subsystem 180 receives the seed dataset 179 and performs certain processing on the private data included in the seed dataset 179. The certain processing performed on the private data contained in the seed dataset 179 by the obscured private data preparation subsystem 180 results in a generation of obscured private data.

For example, the obscured private data preparation subsystem 180 may replace, e.g., mask, the entity values in the private data with anonymous values, e.g., random numbers, and generate an obscured seed dataset. The random numbers conceal the true values of the entities and also do not change in the translation of the seed dataset from English to the target language.

The obscured private data preparation subsystem 180 can create a mapping between the true entity values of the private data in the seed dataset 179 and the random values assigned to corresponding entity values.

The primary data generator 177 may further include one or more translating models 181. In an example, the translating models 181 include at least one from among the Oracle Cloud Infrastructure (OCI) Machine Translation (MT) API and M2M 100 model that is open source model from Facebook. The translating models 181 may receive the obscured seed dataset and translate the data included therein into the target language. As a result of the processing performed by the translating models 181, the translated seed dataset is generated, where the entity values of the private data maintain the assigned random numbers within the text in the target language. As such, the translation errors for the entity values, e.g., names, are not introduced.

The primary data generator 177 may further include an entity repopulation subsystem 182. The entity repopulation subsystem 182 receives the translated seed dataset and repopulates the entity values of the private data that have the assigned random numbers, e.g., the masked values, with fake values. The entity repopulation subsystem 182 may also provide annotations to the fake values so that the entity types are recognized in the further processing.

For example, the entity repopulation subsystem 182 may include a randomizer 183 and a faker 184. The faker 184 may be a Python package that generates fake data, as known to those skilled in the relevant art.

The randomizer 183 is used because the faker generally has tendency to miss on numerous situations that are seen in the real world. Therefore, the faker 184 is not applied on all of the masked values.

The randomizer 183 is configured to replace the random numbers corresponding to the entity values of first entities, with fake values in the target language using a pseudo-random process where a set of masked values (e.g., numbers) are provided with pre-defined context. As a non-limiting example, the first entities may include one or more of DATE_TIME, AGE, and PERSON. The examples of the fake values given by the randomizer 183 to the first entities are shown below:

| Entity: | Fake Value: |
| --- | --- |
| DATE_TIME: | today, weekdays, tonight, yesterday, festivals, etc. |
| PERSON: | long names (e.g., greater than 2 words), randomized prefixes, non-binary person names, etc. |
| AGE: | 20 years, 30 years, 2 months, 1 month, etc. |

The faker 184 is configured to replace the random numbers corresponding to the entity values of second entities, with fake values. The second entities may correspond to the entities that are not the first entities.

As described above, in embodiments, the fake values for entity values are generated in a desired language before injecting them in the model. For example, the fake values can be created to identify the entity types and, thus, it is known what to look for in the output and the text can be used to train language models. The generated synthetic data is completely free of true entity values corresponding to PII entities, thus enabling the training of the downstream models on realistic data without breaching privacy.

The localized fake entity values in the fine-tuning and inference data of the algorithm allows the model to generalize on the fake values leading to coherent text output. A probabilistic approach of choosing the random fake values ensures that the generated text is not deviating and conveys a feeling of continuous conversation.

As a result of the processing performed by the obscured private data preparation subsystem 180, the translating models 181, and the entity repopulation subsystem 182, a primary data 186 is generated. The primary data 186 may be used by the refined model generation subsystem 118 to generate one or more refined models 188, e.g., a refined KBTGM 190.

2. Refined KBTGM Generation

With continuing reference to FIG. 1B and reference again to FIG. 1C, the refined model generation subsystem 118 may include a refined model training subsystem 194 configured to train one or more custom models 153 using one or more refined training datasets 131, to generate one or more refined models 188.

In some embodiments, the refined model training subsystem 194 may include a refined KBTGM generator 195. The refined KBTGM generator 195 obtains, as an input, the KBTGM 161 generated by the custom model generation subsystem 114. The refined KBTGM generator 195 may perform training on, e.g., fine-tune, the KBTGM 161 using the primary data 186, to generate a refined KBTGM 190, e.g., a first refined model or a first refined text generation model.

The refined KBTGM 190 is a bilingual model that is capable of receiving, as an input, keywords containing private PII data, and generating one or more sentences in which these keywords are present.

In some embodiments, the refined KBTGM 190 may be stored in the storage subsystem 104.

3. Second Refined Training Dataset Generation

With continuing reference to FIGS. 1B, in certain embodiments, the refined training dataset generation subsystem 126 may further include a refined primary data generator 191. The refined primary data generator 191 can obtain, as an input, the primary data 186 and perform processing on the primary data 186, to generate second refined training dataset(s). For example, the second refined training dataset generated by the refined primary data generator 191 can then be used as an input for the refined model generation subsystem 118 to generate a refined MKSNSGM 192, e.g., a second refined model.

In some embodiments, the refined primary data generator 191 uses the DLTSM 164 to provide summaries of the primary data 186, similarly to what is described above with respect to the public data, in the section entitled "Third enhanced training dataset generation."

For example, the refined primary data generator 191 performs processing on the primary data 186 that is similar to the processing performed by the second filter 172 and the second tokenizer 174. The refined primary data generator 191 outputs a result of the processing performed on the primary data 186 that is then used as an input to the DLTSM 164. Accordingly, the DLTSM 164 receives, as an input, one or more tokenized paragraphs of the primary data 186, and recursively calculates primary data summaries 187 for the sentences of the paragraph.

The refined primary data generator 191 can also perform processing on the primary data 186 to obtain probability-based entity-aligned primary data 189. The probability-based entity-aligned primary data 189 is generated by the processing similar to the processing described above with regard to the STMKNS triplet generation subsystem 168, by using the case specific data, e.g., primary data obtained based on PII entity data, key processing entity (KPE) data, protected health information (PHI) data, etc. The format of the probability-based entity-aligned primary data 189 is similar to a format of the data of the STMKNS triplets dataset 170 shown in Table 3.

The primary data summaries 187 and the probability-based entity-aligned primary data 189, e.g., the second refined training dataset(s), can then be used as an input for the second training stage performed by the refined model generation subsystem 118 generate one or more refined models 188, e.g., a refined MKSNSGM 192.

4. Refined MKSNSGM Generation

With reference again to FIG. 1C, the refined model generation subsystem 118 can include a refined MKSNSGM generator 196. The refined MKSNSGM generator 196 is configured to obtain, as an input, the MKSNSGM 169 generated by the custom model generation subsystem 114. The refined MKSNSGM generator 196 may perform training on, e.g., fine-tune, the MKSNSGM 169 using the primary data summaries 187 and the probability-based entity-aligned primary data 189.

As a result of the training performed by the refined MKSNSGM generator 196, the refined model training subsystem 194 generates and outputs the refined MKSNSGM 192, e.g., a second refined model or a refined next sentence generation model.

The refined MKSNSGM 192 is a bilingual model that is capable of receiving, as an input, keywords containing private PII data (e.g., fake values) and a text summary, and generating one or more next sentences in which these keywords are present.

In some embodiments, the refined MKSNSGM 192 may be stored in the storage subsystem 104.

However, the described above is not intended to be limiting, e.g., the fine-tuning at the second training stage does not have to be specific to the PII data. The fine-tuning at the second training stage may be performed for any use case by preparing the primary data corresponding to the use case.

For example, for producing texts in the medical domain, the base model can be generated starting with MedBERT instead of mT5. Similarly, for producing texts in the financial domain, the base model can be generated starting with FinBERT instead of mT5.

III. USAGE EXAMPLE(S)

Once all the refined models 188 are trained and ready for inference, they can be used together to generate outputs that are contextually meaningful and contain all required entities pertaining to the private data. However, the described below is equally applicable to the custom models 153 using the public data containing the entities.

For example, if a number of entities is fewer than 5, the refined KBTGM 190 is used. If a number of entities is equal to or greater than 5, then the refined MKSNSGM 192 is used. Here, a threshold number of entities, e.g., 5, was determined based on the experiment to capture the required entities by using the refined KBTGM 190 without an involvement of the refined MKSNSGM 192. When fewer than 5 entities were passed to the refined KBTGM 190, the refined KBTGM 190 was able to capture all of the entities correctly 90% of the time.

That is, in some instances, even if a number of entities is fewer than 5, the refined KBTGM 190 may miss one or more entities when generating the text. In such instances, the refined models 188 can be used as follows:

1. Pass the required entities to the refined KBTGM 190 and then check if the generated sentences contain all the required entities.
2. If not, summarize the entire text using the DLTSM 164, append it with missed entities, and pass it to the refined MKSNSGM 192 that produces the next sentence containing the missed entities.
3. Concatenate the next sentence with the paragraph generated in Step 1.
4. Perform Steps 2-3 until all entities are covered.

For an example of Spanish Text shown below in Table 4, the required entities are person's name, SSN, and age, as shown in column 2 of the table below. The task is to generate the text that will include this person's name, SSN, and age, where person's name, SSN, and age are an input to the pipeline.

First, the person's name, SSN, and age are given fake values, as shown in column 1 of the Table 4 below. The fake values may be provided by the faker and/or the randomizer similar to those described above. In an example of a first row of Table 4 shown below, the fakes values generated in Spanish are:

Person's Name→Leyre Arenas Grau
SSN→925-98-8979
Ag→8 años

Since a number of entities is fewer than 5, the fake values are provided as an input to the refined KBTGM 190. In an example, the refined KBTGM 190 is able to output the text that contains all of the input entities, as shown in column 3 of the table below. Column 4 shown a translation of Spanish text for reference, e.g., the translation is not generated by the refined KBTGM 190.

However, in some cases, not all of the entities may be present in the generated text of column 3. For example, the refined KBTGM 190 might be able to generate the text that contains the person's name and SSN, but miss the age, e.g., 8 años. In this case, the whole text that is generated until now by the refined KBTGM 190, e.g., the text that contains the person's name and SSN, is input to the DLTSM 164 that summarizes the text. Then, the missing entity, e.g., age, is appended to the summarized text and the text summarization with the missing entity are provided to the refined MKSNSGM 192 that is capable to predict a next sentence that contains a missing entity by taking into consideration the meaning of the text that was already generated, e.g., generates a next sentence based on the certain context. The next sentence is added to the non-summarized text previously generated by the refined KBTGM 190. These operations can continue until all of the entities are present in the generated text.

TABLE 4

| Input Entity Values | Entity Names | Generated Text | English Translation |
|---|---|---|---|
| ['Leyre Arenas Grau', '925-98-8979', '8 años'] | ['PERSON_PII', SSN_PII', AGE_PII'] | Hola, soy Leyre Arenas Grau con número de Seguro Social 925-98-8979. Me gustaría solicitar una beca en su programa educativo para personas mayores de 8 años que ingresan a la Carrera Nacional Universitaria (UNAN). | Hi, I'm Leyre Arenas Grau with Social Security number 925-98-8979. I would like to apply for a scholarship in your educational program for people over 8 years old who enter the National University Career (UNC). |
| ['34737773952405587425', 'hace un par años'] | ['BANK_SWIFT_PII', 'DATE_TIME_PII'] | Hola, tengo una cuenta en su sucursal. El nombre de mi empresa es Wells Fargo Bank con el código SWIFT 34737773952405587425 para la transferencia bancaria internacional del pago inicial al préstamo personal que solicité hace un par años. | Hello, I have an account in your branch. My company name is Wells Fargo Bank with SWIFT code 34737773952405587425 for the international wire transfer of the personal loan down payment I applied a couple of years ago. |
| ['P9524495'] | ['DRIVER_ID'] | Gracias por enviar su solicitud de licencia de conducir con nosotros. Solo necesitamos una formal de la identificación, que es P9524495. Asi que, si desea renovar con éxito la documentación original en este momento. | Thank you for submitting your driver's license application with us. We just need a formal ID, which is P9524495. So, if you wish to successfully renew the original documentation at this time. |

In some embodiments, the refined models 188 can be used as follows. In an example, a number of entities is 12. At first, 4 entities can be passed to the refined KBTGM 190 to generate the text. Then, a number of next entities, e.g., 4, may be passed to the refined MKSNSGM 192 to predict one or more next sentences that contain the next 4 entities by involving the DLTSM 164, as described above. The next sentences are added to the text previously generated by the refined KBTGM 190. A remaining number of entities, e.g., 4, can again be passed to the refined KBTGM 190.

As described above, at the preparation stage, the base model can be prepared with a constrained vocabulary in a target language and in English. At the first training stage, the base model can be trained on public data to generate custom models that, using the public data, can (i) predict text based on the keywords, (ii) summarize text, and (iii) predict a next sentence appendable to the text generated in (i).

At the second training stage, the custom models can further be trained on the private data, e.g., use case data, to perform specific tasks. As a result of training, the refined models may be generated that, based on specific private data (e.g., including entities), can (i) predict text based on the entity values (e.g., keywords) and (ii) predict a next sentence appendable to the text generated in (i).

The generated data has been used to train NER model for Language PII task which showed an enhancement in F1-scores of 7-8% on an average and more than 50% for some specific entities.

IV. TRAINING AND DEPLOYMENT

FIG. 5 is a block diagram illustrating a machine-learning system 500 in accordance with various embodiments. For example, the machine-learning system 500 may be a part of the natural language generation system 98 or may be in communication with the natural language generation system 98, to facilitate the training of the models.

As shown in FIG. 5, the machine-learning system 500 includes various stages: a prediction model training stage 210 to build and train models, an evaluation stage 215 to evaluate performance of trained models, and an implementation stage 220 for implementing one or more models. The prediction model training stage 210 builds and trains one or more prediction models 225a and 225b to 225n ('n' represents any natural number) to be used by the other stages (which may be referred to herein individually as a prediction model 225 or collectively as the prediction models 225). For example, the prediction models 225 can include any machine learning model described above with respect to the natural language generation system 98. Still other types of prediction models may be implemented in other examples according to this disclosure such as named entity recognition modeling and text classification.

A prediction model 225 can be a machine-learning model, of a type of the machine-learning models described above. The natural language generation system 98 may employ the same type of prediction model or different types of prediction models for providing predictions to users. In certain instances, the prediction model 225 performs natural language generation using a fine-tuned T5-based model. Still other types of prediction models may be implemented in other examples according to embodiments.

To train the various prediction models 225, the prediction model training stage 210 includes three main components: dataset preparation module 230, model training framework 240, and evaluation stage 215. The dataset preparation module 230 performs the processes of loading data assets

245 (e.g., the training datasets), splitting the data assets 245 into training and validation sets 245a-n so that the system can train and test the prediction models 225, and pre-processing of data assets 245. The splitting the data assets 245 into training and validation sets 245a-n may be performed randomly (e.g., a 60/40%, 70/30%, etc.).

In some instances, the training data 245a includes the augmented texts and/or embeddings of the augmented texts. The augmented texts and/or embeddings of the augmented texts can be obtained as described in the dataset preparation and enhancement section. The dataset preparation module 230 may standardize the format of the data within the augmented texts and/or embeddings of the augmented texts. In some instances, the training data 245a includes the data within the augmented texts and/or embeddings of the augmented texts and labels 250 corresponding to the data as a matrix or table of values. For example, for each augmented text and/or embedding of the augmented text, an indication of the entities, context, and/or natural language sample (e.g., natural language sentence) to be inferred by the prediction model 225 may be provided as ground truth information for labels 250. The behavior of the prediction model 225 can then be adapted (e.g., through MinMax or ALS optimization or Gradient Descent) to minimize the difference between the generated inferences and the ground truth information.

The model training framework 240 performs the processes of determining hyperparameters for the prediction model 225 and performing iterative operations of inputting examples from the training data 245a into the prediction model 225 to find a set of model parameters (e.g., weights and/or biases) that minimizes a cost function(s) such as loss or error function for the prediction model 225. The hyperparameters are settings that can be tuned or optimized to control the behavior of the prediction model 225. Most models explicitly define hyperparameters that control different features of the models such as memory or cost of execution. However, additional hyperparameters may be defined to adapt the prediction model 225 to a specific scenario as, for example, learning rate, number of iterations, regularization weight or strength, and the like.

The cost function can be constructed to measure the difference between the outputs inferred using the prediction models 225 and the ground truth annotated to the samples using the labels. For example, for a supervised learning based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the cost or loss function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to minimize this cost or loss function.

Once the set of model parameters is identified, the model 225 has been trained and the model training framework 240 performs the additional processes of testing or validation using the subset of testing data 245b (testing or validation dataset). The testing or validation processes includes iterative operations of inputting samples from the subset of testing data 245b into the prediction model 225 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test dataset from the subset of training data 245a may be input into the prediction model 225 to obtain output (in this example, one or more recognized entities), and the output is evaluated versus ground truth entities using correlation techniques such as Bland-Altman method and the Spearman's rank correlation coefficients. Further, performance metrics 255 may be calculated in evaluation stage 215 such as the error, accuracy, precision, recall, receiver operating characteristic curve (ROC), etc. The performance metrics 255 may be used in the evaluation stage 215 to analyze performance of the prediction model 225.

The prediction model training stage 210 outputs trained models including one or more trained prediction models 260. The one or more trained prediction models 260 may be deployed and used in the implementation stage 220 for providing predictions 265 (e.g., generating natural language text) to users. For example, the trained prediction models 260 may receive input data 270 including a set of entities and provide predictions (or outputs) 265 to a user.

V. METHODS

Figure 6:
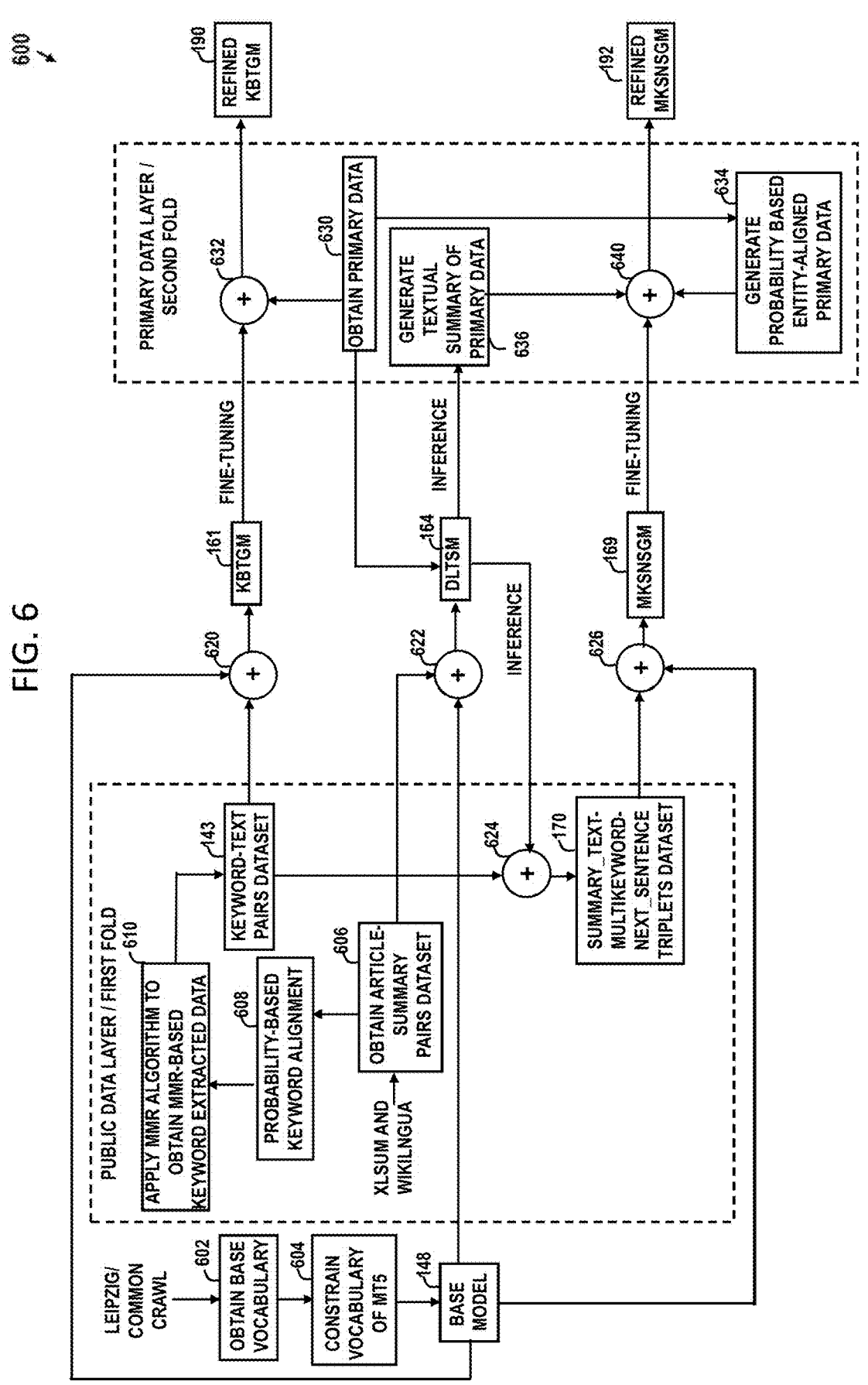
FIG. 6 depicts processing performed by the natural language generation system according to various embodiments.

FIG. 6 depicts processing according to various embodiments. For example, the processing 600 depicted in FIG. 6 may be performed by the model training subsystem 100 and the training data generation subsystem 102.

The processing 600 depicted in FIG. 6 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing operations occurring in a particular sequence or order, this is not intended to be limiting. In certain alternative embodiments, the processing 600 may be performed in some different order or some operations may be performed at least partially in parallel.

The details of the operations performed by the model training subsystem 100 and the training data generation subsystem 102, as described above with reference to FIGS. 1A-1C, 4, and 5, apply to the processing 600 and will not be repeated here.

With continuing reference to FIG. 6, at operation 602, the training data generation subsystem 102 may obtain a base vocabulary 123, e.g., a constrained vocabulary, from a common crawl and/or Leipzig corpora, e.g., the first public data.

At operation 604, the model training subsystem 100 may use the base vocabulary 123 to constrain the vocabulary of the mT5 model. As a result of the operation 604, the base model 148 is generated.

At operation 606, the training data generation subsystem 102 may obtain the article-summary pairs dataset 138 from the XLSum and/or the WikiLingua, e.g., the second public data.

At operation 608, the training data generation subsystem 102 may perform a probability-based keyword alignment using LABSE embeddings.

At operation 610, the training data generation subsystem 102 may apply the MMR on the probability-based keyword alignment. As a result of the operation 610, the keyword-text pairs dataset 143 is generated.

At operation 620, the model training subsystem 100 may the train base model 148 using the keyword-text pairs dataset 143, to generate the KBTGM 161.

At operation 622, the model training subsystem 100 may the train base model 148 using the article-summary pairs dataset 138, to generate the DLTSM 164.

At operation 624, the training data generation subsystem 102 may use the keyword-text pairs dataset 143 and the DLTSM 164, to obtain the STMKNS triplets dataset 170.

At operation 626, the model training subsystem 100 may the train base model 148 using the STMKNS triplets dataset 170, to generate the MKSNSGM 169.

At operation 630, the training data generation subsystem 102 may obtain the primary data 186 using the seed dataset 179.

At operation 632, the model training subsystem 100 may train, e.g., fine-tune, the KBTGM 161 generated in operation 620 using the primary data 186, to generate the refined KBTGM 190.

At operation 634, the training data generation subsystem 102 may generate the probability-based entity-aligned primary data 189.

At operation 636, the training data generation subsystem 102 may use the primary data 186 and the DLTSM 164, to generate the primary data summaries 187.

At operation 640, the model training subsystem 100 may train, e.g., fine-tune, the MKSNSGM 169 generated in operation 626 using the probability-based entity-aligned primary data 189 and the primary data summaries 187, to generate the refined MKSNSGM 192.

FIG. 7A depicts processing according to various embodiments. For example, the processing 700 depicted in FIG. 7A may be performed by the model training subsystem 100 and/or the training data generation subsystem 102.

The processing 700 depicted in FIG. 7A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7A and described below is intended to be illustrative and non-limiting. Although FIG. 7A depicts the various processing operations occurring in a particular sequence or order, this is not intended to be limiting. In certain alternative embodiments, the processing 700 may be performed in some different order or some operations may be performed at least partially in parallel.

The details of the operations performed by the model training subsystem 100 and the training data generation subsystem 102, as described above with reference to FIGS. 1A-1C and 4-6, apply to the processing 700 and will not be repeated here.

With continuing reference to FIG. 7A, at operation 702, the model training subsystem 100 may prepare the base model 148 using an input model 113 pretrained on at least three languages different from each other and a base vocabulary 123 including words corresponding to two languages among the at least three languages, where the preparing the base model includes constraining the input model to the words included in the base vocabulary 123.

In some embodiments, the input model 113 is a transformer-based model.

In some embodiments, the input model 113 is an mT5 model.

In some embodiments, the base model 148 is a modified mT5 model, and, in the base model, a vocabulary of the mT5 model is restricted to a first number of words in a target language and a second number of words in English.

At operation 704, the model training subsystem 100 may train the base model 148 using a first enhanced training dataset, e.g., the article-summary pairs dataset 138 generated from first public data, to generate a text summarization model, e.g., the DLTSM 164.

In some embodiments, the first enhanced training dataset includes article-summary pairs, and for each article-summary pair, an article serves as an input training datapoint and a corresponding summary serves as a given output.

At operation 706, the model training subsystem 100 may train the base model 148 using a second enhanced training dataset, e.g., keyword-text pairs dataset 143 generated from the first enhanced training dataset, to generate a text generation model, e.g., the KBTGM 161.

In some embodiments, the second enhanced training dataset includes keyword-text pairs, and, for each keyword-text pair, one or more keywords serve as an input training datapoint and a corresponding text serves as a given output.

At operation 708, the model training subsystem 100 may train the base model 148 using a third enhanced training dataset, e.g., STMKNS triplets dataset 170, that is generated using the second enhanced training dataset and the text summarization model, to generate a next sentence generation model, e.g., the MKSNSGM 169.

In some embodiments, the third enhanced training dataset includes summary-keywords-next sentence triplets, and, for each summary-keywords-next sentence triplet, a summary and keywords serve as an input training datapoint and a corresponding next sentence serves as a given output.

In various embodiments, the generated text generation model is trained to, based on an input of one or more first keywords, output text including at least one first keyword among the one or more first keywords, the generated text summarization model is trained to, based on an input of the text, output a text summary, and the generated next sentence generation model is trained to, based on an input of one or more second keywords and the text summary, output a next sentence that is appendable to the text generated by the text generation model and includes at least one second keyword among the one or more second keywords.

In various embodiments, each of the text generation model, the text summarization model, and the next sentence generation model is a bilingual model that is trained on the two languages including a target language and English, and configured to output predictions based on an input provided in the target language, English, or a mixed language in which the target language and English are intermixed.

In various embodiments, the model training subsystem 100 may further generate a plurality of refined models 188 by training the text generation model and the next sentence generation model using a plurality of refined training datasets 131 generated using the text summarization model and private data.

In various embodiments, the model training subsystem 100 generates the plurality of refined models by training the text generation model using a first refined training dataset among the plurality of refined training datasets, to generate the refined text generation model, where the first refined training dataset is generated based on the private data and includes fake values given to entity values included in the private data, and training the next sentence generation model using a second refined training dataset among the plurality of refined training datasets, to generate the refined next sentence generation model, where the second refined training dataset is generated using the first refined training dataset and the text summarization model.

In various embodiments, the plurality of refined models includes a refined text generation model, e.g., the refined KBTGM 190, and a refined next sentence generation model, e.g., the refined MKSNSGM 192.

In some embodiments, the first refined training dataset is the primary data 186.

In some embodiments, the second refined training dataset includes the primary data summaries 187 and the probability-based entity-aligned primary data 189.

In various embodiments, the refined text generation model is trained to, based on an input of one or more first entity values, output text including at least one first entity value among the one or more first entity values.

In various embodiments, the refined next sentence generation model is trained to, based on an input of one or more second entity values and a primary text summary generated by the text summarization model based on the text output by the refined text generation model, output a next sentence that is appendable to the text output by the refined text generation model and includes at least one second entity value among the one or more second entity values.

FIG. 7B depicts processing according to various embodiments. For example, the processing 720 depicted in FIG. 7B may be performed by at least one of the model training subsystem 100 and the training data generation subsystem 102.

The processing 720 depicted in FIG. 7B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7B and described below is intended to be illustrative and non-limiting. Although FIG. 7B depicts the various processing operations occurring in a particular sequence or order, this is not intended to be limiting. In certain alternative embodiments, the processing 720 may be performed in some different order or some operations may be performed at least partially in parallel.

The details of the operations performed by the model training subsystem 100 and the training data generation subsystem 102, as described above with reference to FIGS. 1A-1C and 4-7A, apply to the processing 720 and will not be repeated here.

With continuing reference to FIG. 7B, at operation 722, the training data generation subsystem 102 may obtain, from text corpus including article-summary pairs in a plurality of languages, a plurality of article-summary pairs in a target language, to form an article-summary pairs dataset 138 in which each article corresponds to a summary.

In some embodiments, the training data generation subsystem 102 may obtain the article-summary pairs by identifying, in the text corpus, a set of article-summary pairs to include the article-summary pairs in the target language, filtering the article-summary pairs of the set to exclude article-summary pairs having, in a corresponding article, a number of words exceeding a threshold number of words, dividing the article-summary pairs of the set that have a number of words in a corresponding article no more than the threshold number of words, into a plurality of groups based on a word count in articles of the article-summary pairs, and forming the article-summary pairs dataset 138 by selecting a different number of article-summary pairs from each of the plurality of groups, so that a group having the article-summary pairs with a smallest word count in the articles represents a largest apportionment in the article-summary pairs dataset 138 and a group having the article-summary pairs with a greatest word count in the articles represents a smallest apportionment in the article-summary pairs dataset 138.

In some embodiments, the article-summary pairs dataset 138 is used to train a text summarization model, e.g., the DLTSM 164, where the articles are used as input training datapoints and, during training, the text summarization model learns, based on an input of an article, output a text summary corresponding to the article.

At operation 724, the training data generation subsystem 102 may input articles from the article-summary pairs to a machine learning model, where the machine learning model may be a LAB SE model.

At operation 726, the training data generation subsystem 102 may generate, by using the machine learning model, embeddings for sentences of the articles.

At operation 728, the training data generation subsystem 102 may extract, by using the machine learning model, keywords from the articles with a probability that varies based on lengths of the sentences, respectively.

At operation 730, the training data generation subsystem 102 may output the keywords extracted by the machine learning model.

At operation 732, the training data generation subsystem 102 may apply a maximal marginal relevance algorithm to the extracted keywords, to select relevant keywords.

At operation 734, the training data generation subsystem 102 may generate a keyword-text pairs dataset 143 that includes the relevant keywords and text from the articles, the text corresponding to the relevant keywords in each of the keyword-text pairs.

In some embodiments, the keyword-text pairs dataset 143 is used to train a text generation model, e.g., the KBTGM 161, where the relevant keywords are used as input training datapoints and, during training, the text generation model learns, based on an input of a relevant keyword, output the text corresponding to the relevant keywords.

In some embodiments, the training data generation subsystem 102 may further generate a summary-keyword-next sentence triplets dataset 170 using the keyword-text pairs dataset 143 and the text summarization model, e.g., the DLTSM 164.

In some embodiments, the training data generation subsystem 102 may generate the summary-keyword-next sentence triplets dataset 170 by tokenizing sentences of a paragraph of the text of a keyword-text pair of the keyword-text pairs dataset 143, and recursively calculating, using the text summarization model, text summaries of the tokenized sentences.

In some embodiments, the generating the summary-keyword-next sentence triplets dataset 170 further includes associating, with a text summary of one or more first tokenized sentences of a preceding text of a paragraph, keywords that are present in a subsequent text of the paragraph that follows the preceding text, the one or more first tokenized sentences being included in the tokenized sentences, and associating, the keywords that are present in the subsequent text, with one or more second tokenized sentences of the subsequent text, the one or more second tokenized sentences being included in the tokenized sentences.

In some embodiments, the summary-keyword-next sentence triplets dataset 170 is used to train a next sentence generation model, e.g., the MKSNSGM 169, where the text summary of the preceding text and the keywords present in the subsequent text that are associated with the text summary of the preceding text, are used as input training datapoints and, during training, the next sentence generation model learns, based on an input of the text summary of the preceding text and the keywords present in the subsequent text, output one or more next sentences that are appendable to the preceding text and include the keywords input to the next sentence generation model.

VI. ILLUSTRATIVE SYSTEMS

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
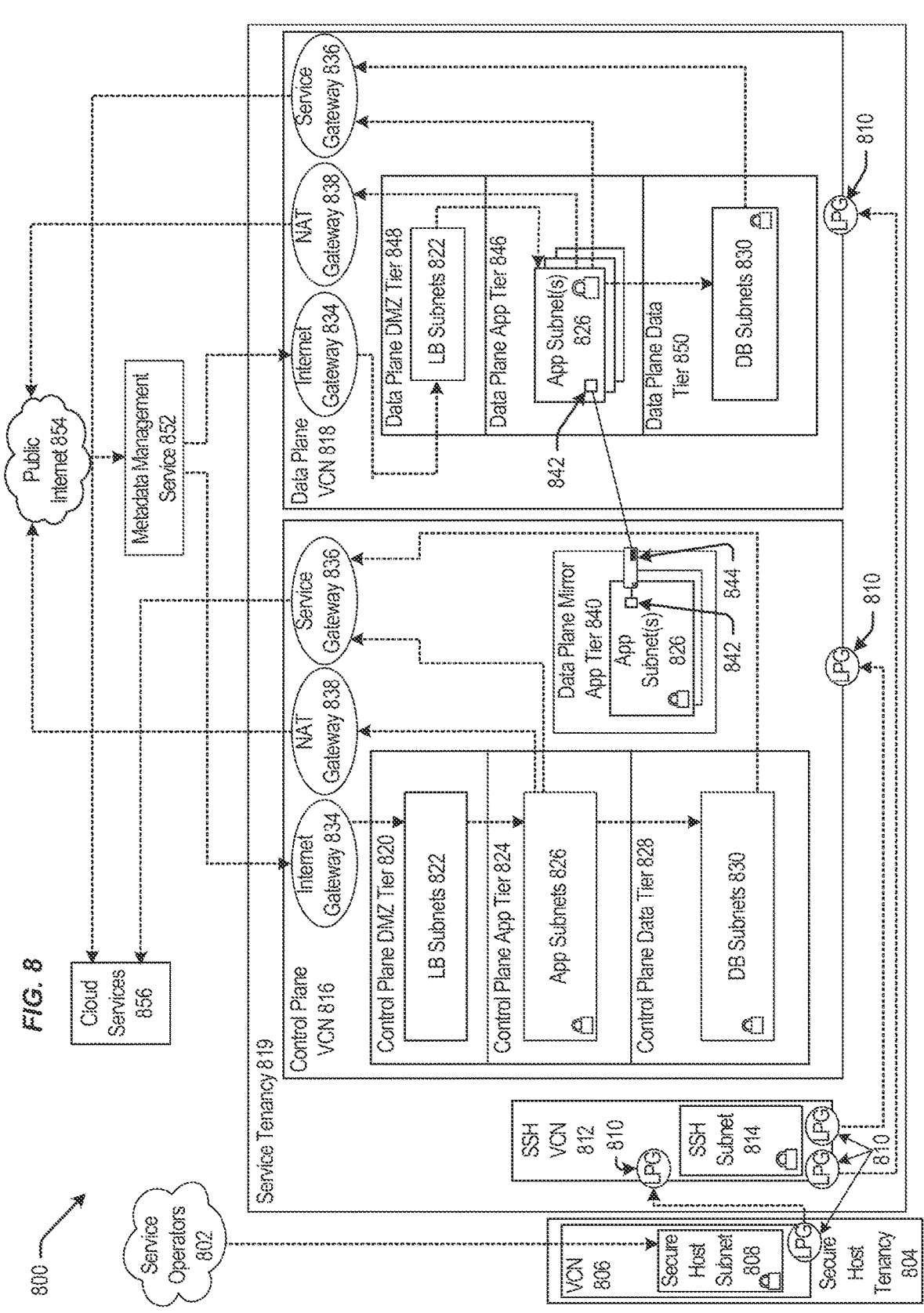
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
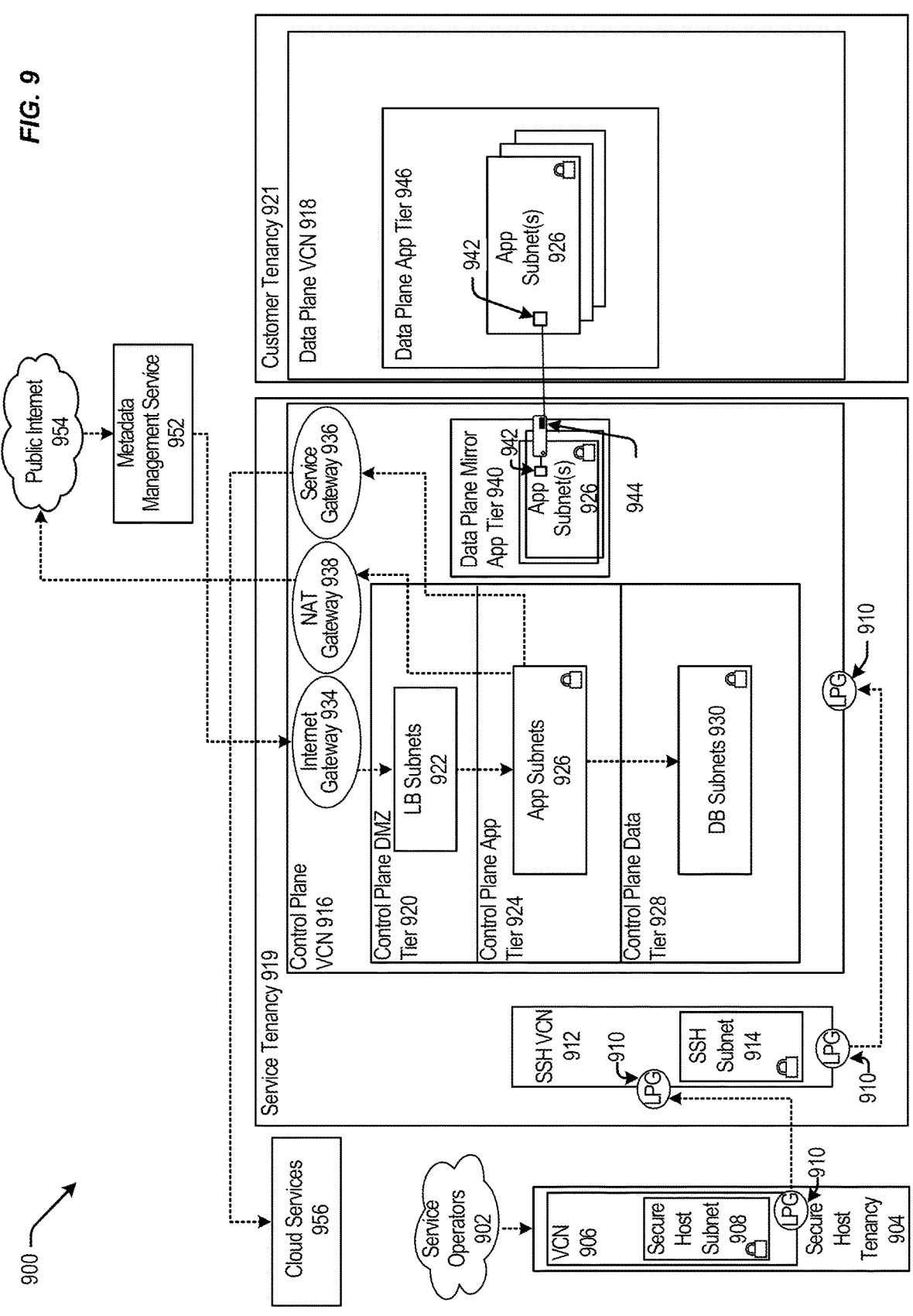
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
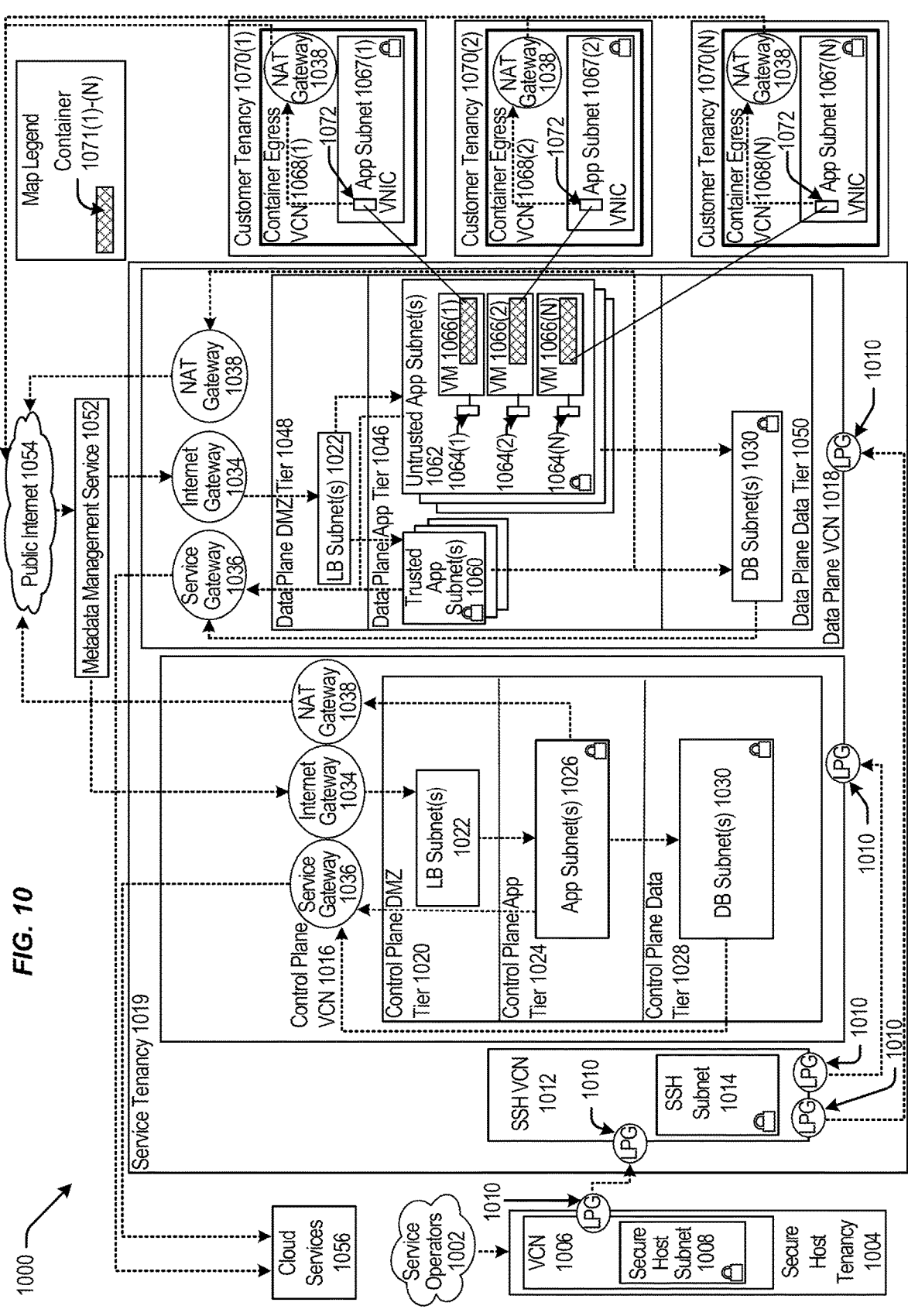
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072 can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
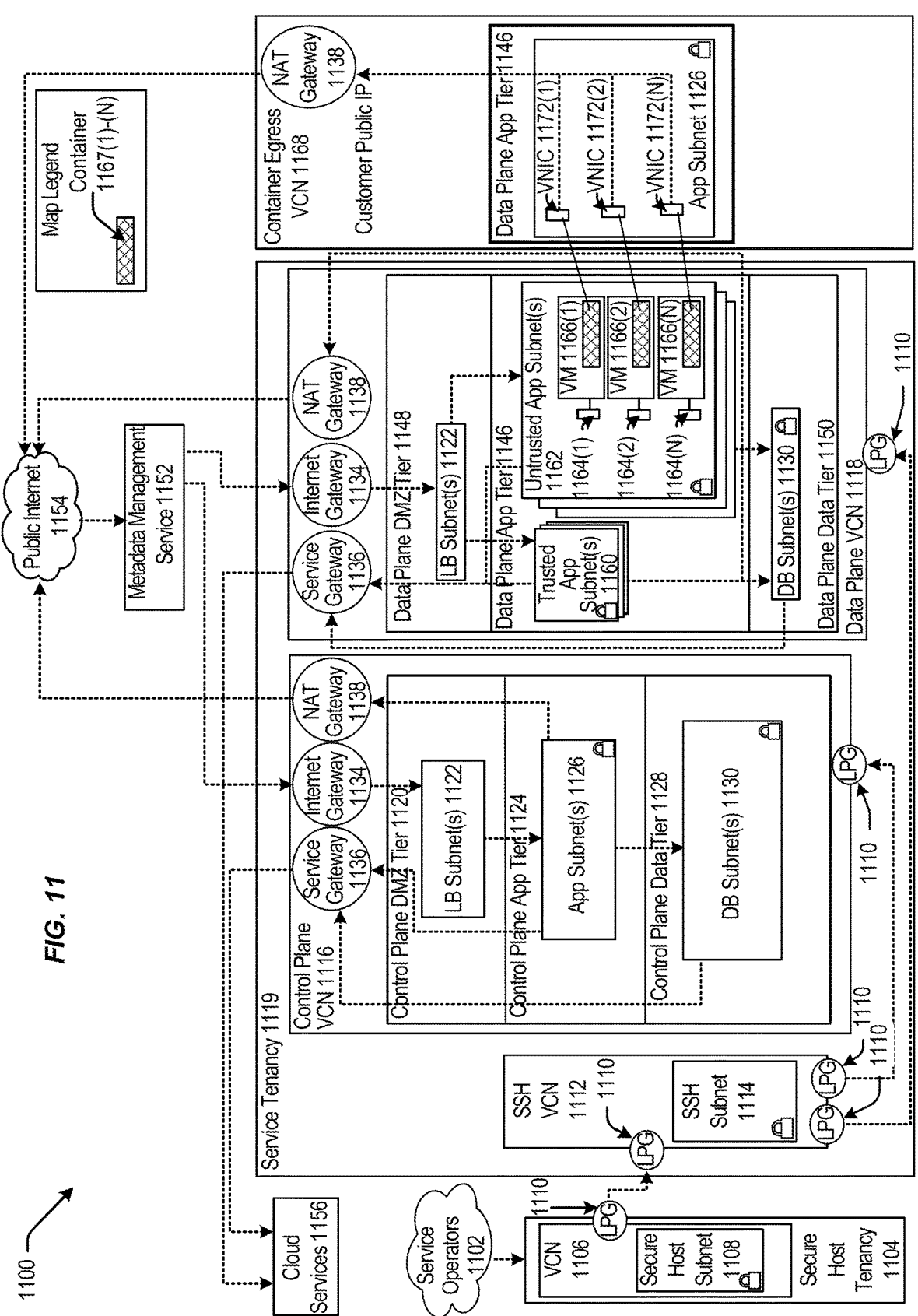
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that includes software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G, 5G or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
obtaining, from text corpus comprising article-summary pairs in a plurality of languages, a plurality of article-summary pairs in a target language among the plurality of languages, to form an article-summary pairs dataset in which each article corresponds to a summary;

inputting articles from the article-summary pairs to a machine learning model;

generating, by the machine learning model, embeddings for sentences of the articles;

extracting, by the machine learning model, keywords from the articles with a probability that varies based on lengths of the sentences, respectively;

outputting, by the machine learning model, the keywords;

applying a maximal marginal relevance algorithm to the extracted keywords, to select a set of relevant keywords;

generating a keyword-text pairs dataset that includes the set of relevant keywords and text from the articles, wherein each keyword-text pair comprises one or more relevant keywords from the set of relevant keywords and the text from the articles that includes the one or more relevant keywords; and training a text generation model using the keyword-text pairs dataset, to generate a trained text generation model, wherein, for each keyword-text pair, the one or more relevant keywords serves as an input training datapoint and a corresponding text serves as a given output, and, during training, the text generation model learns, based on an input of a relevant keyword, to output the text corresponding to the one or more relevant keywords, wherein the trained text generation model is configured to, based on an input of one or more keywords, generate and output text corresponding to at least one keyword among the one or more keywords.

2. The computer-implemented method of claim 1, wherein the obtaining the plurality of article-summary pairs further comprises:

identifying, in the text corpus, a set of article-summary pairs to include the article-summary pairs in the target language;

filtering the article-summary pairs of the set to exclude article-summary pairs having, in a corresponding article, a number of words exceeding a threshold number of words;

dividing the article-summary pairs of the set that have a number of words in a corresponding article no more than the threshold number of words, into a plurality of groups based on a word count in articles of the article-summary pairs; and forming the article-summary pairs dataset by selecting a different number of article-summary pairs from each of the plurality of groups, so that a group having the article-summary pairs with a smallest word count in the articles represents a largest apportionment in the article-summary pairs dataset and a group having the article-summary pairs with a greatest word count in the articles represents a smallest apportionment in the article-summary pairs dataset.

3. The computer-implemented method of claim 1, wherein the machine learning model is a language agnostic BERT sentence embedding (LABSE) model.

4. The computer-implemented method of claim 1, wherein:

the article-summary pairs dataset is used to train a text summarization model, the articles are used as input training datapoints and, during training, the text summarization model learns, based on an input of an article, to output a text summary corresponding to the article, and the computer-implemented method further comprises:

generating a summary-keyword-next sentence triplets dataset using the keyword-text pairs dataset and the text summarization model.

5. The computer-implemented method of claim 4, further comprising:

tokenizing sentences of a paragraph of the text of a keyword-text pair of the keyword-text pairs dataset; and recursively calculating, using the text summarization model, text summaries of the tokenized sentences.

6. The computer-implemented method of claim 5, wherein the generating the summary-keyword-next sentence triplets dataset further comprises:

associating, with a text summary of one or more first tokenized sentences of a preceding text of a paragraph, keywords that are present in a subsequent text of the paragraph that follows the preceding text, the one or more first tokenized sentences being included in the tokenized sentences, and associating, the keywords that are present in the subsequent text, with one or more second tokenized sentences of the subsequent text, the one or more second tokenized sentences being included in the tokenized sentences.

7. The computer-implemented method of claim 6, wherein the summary-keyword-next sentence triplets dataset is used to train a next sentence generation model, wherein a text summary of the preceding text and the keywords present in the subsequent text that are associated with the text summary of the preceding text, are used as input training datapoints and, during training, the next sentence generation model learns, based on an input of the text summary of the preceding text and the keywords present in the subsequent text, output, to output one or more next sentences that are appendable to the preceding text and include the keywords input to the next sentence generation model.

8. The computer-implemented method of claim 1, wherein the text generated by the trained text generation model includes the at least one keyword.

9. A system comprising:

one or more processors;

a memory that is coupled to the one or more processors and stores one or more instructions that, when executed by the one or more processors, cause the one or more processors to perform a method including:

obtaining, from text corpus comprising article-summary pairs in a plurality of languages, a plurality of article-summary pairs in a target language among the plurality of languages, to form an article-summary pairs dataset in which each article corresponds to a summary;

inputting articles from the article-summary pairs to a machine learning model;

generating, by the machine learning model, embeddings for sentences of the articles;

extracting, by the machine learning model, keywords from the articles with a probability that varies based on lengths of the sentences, respectively;

outputting, by the machine learning model, the keywords;

applying a maximal marginal relevance algorithm to the extracted keywords, to select a set of relevant keywords;

generating a keyword-text pairs dataset that includes the set of relevant keywords and text from the articles, wherein each keyword-text pair comprises one or more relevant keywords from the set of relevant keywords and the text from the articles that includes the one or more relevant keywords; and training a text generation model using the keyword-text pairs dataset, to generate a trained text generation model, wherein, for each keyword-text pair, the one or more relevant keywords serves as an input training datapoint and a corresponding text serves as a given output, and, during training, the text generation model learns, based on an input of a relevant keyword, to output the text corresponding to the one or more relevant keywords, wherein the trained text generation model is configured to, based on an input of one or more keywords, generate and output text corresponding to at least one keyword among the one or more keywords.

10. The system of claim 9, wherein the obtaining the plurality of article-summary pairs further includes:

identifying, in the text corpus, a set of article-summary pairs to include the article-summary pairs in the target language;

filtering the article-summary pairs of the set to exclude article-summary pairs having, in a corresponding article, a number of words exceeding a threshold number of words;

dividing the article-summary pairs of the set that have a number of words in a corresponding article no more than the threshold number of words, into a plurality of groups based on a word count in articles of the article-summary pairs; and forming the article-summary pairs dataset by selecting a different number of article-summary pairs from each of the plurality of groups, so that a group having the article-summary pairs with a smallest word count in the articles represents a largest apportionment in the article-summary pairs dataset and a group having the article-summary pairs with a greatest word count in the articles represents a smallest apportionment in the article-summary pairs dataset.

11. The system of claim 9, wherein the machine learning model is a language agnostic BERT sentence embedding (LABSE) model.

12. The system of claim 9, wherein:

the article-summary pairs dataset is used to train a text summarization model, the articles are used as input training datapoints and, during training, the text summarization model learns, based on an input of an article, to output a text summary corresponding to the article, and the method further includes:

generating a summary-keyword-next sentence triplets dataset using the keyword-text pairs dataset and the text summarization model.

13. The system of claim 12, wherein the method further includes:

tokenizing sentences of a paragraph of the text of a keyword-text pair of the keyword-text pairs dataset; and recursively calculating, using the text summarization model, text summaries of the tokenized sentences.

14. The system of claim 13, wherein the generating the summary-keyword-next sentence triplets dataset further includes:

associating, with a text summary of one or more first tokenized sentences of a preceding text of a paragraph, keywords that are present in a subsequent text of the paragraph that follows the preceding text, the one or more first tokenized sentences being included in the tokenized sentences, and associating, the keywords that are present in the subsequent text, with one or more second tokenized sentences of the subsequent text, the one or more second tokenized sentences being included in the tokenized sentences.

15. A non-transitory computer-readable memory storing one or more instructions that, when executed by one or more processors, cause the one or more processors to perform a method including:

obtaining, from text corpus comprising article-summary pairs in a plurality of languages, a plurality of article-summary pairs in a target language among the plurality of languages, to form an article-summary pairs dataset in which each article corresponds to a summary;

inputting articles from the article-summary pairs to a machine learning model;

generating, by the machine learning model, embeddings for sentences of the articles;

extracting, by the machine learning model, keywords from the articles with a probability that varies based on lengths of the sentences, respectively;

outputting, by the machine learning model, the keywords;

applying a maximal marginal relevance algorithm to the extracted keywords, to select a set of relevant keywords;

generating a keyword-text pairs dataset that includes the set of relevant keywords and text from the articles, wherein each of keyword-text pair comprises one or more relevant keywords from the set of relevant keywords and the text from the articles that includes the one or more relevant keywords; and training a text generation model using the keyword-text pairs dataset, to generate a trained text generation model, wherein, for each keyword-text pair, the one or more relevant keywords serves as an input training datapoint and a corresponding text serves as a given output, and, during training, the text generation model learns, based on an input of a relevant keyword, to output the text corresponding to the one or more relevant keywords, wherein the trained text generation model is configured to, based on an input of one or more keywords, generate and output text corresponding to at least one keyword among the one or more keywords.

16. The non-transitory computer-readable memory of claim 15, wherein the obtaining the plurality of article-summary pairs further includes:

identifying, in the text corpus, a set of article-summary pairs to include the article-summary pairs in the target language;

filtering the article-summary pairs of the set to exclude article-summary pairs having, in a corresponding article, a number of words exceeding a threshold number of words;

dividing the article-summary pairs of the set that have a number of words in a corresponding article no more than the threshold number of words, into a plurality of groups based on a word count in articles of the article-summary pairs; and forming the article-summary pairs dataset by selecting a different number of article-summary pairs from each of the plurality of groups, so that a group having the article-summary pairs with a smallest word count in the articles represents a largest apportionment in the article-summary pairs dataset and a group having the article-summary pairs with a greatest word count in the articles represents a smallest apportionment in the article-summary pairs dataset.

17. The non-transitory computer-readable memory of claim 15, wherein the machine learning model is a language agnostic BERT sentence embedding (LABSE) model.

18. The non-transitory computer-readable memory of claim 15, wherein:

the article-summary pairs dataset is used to train a text summarization model, the articles are used as input training datapoints and, during training, the text summarization model learns, based on an input of an article, to output a text summary corresponding to the article, and the method further includes:

generating a summary-keyword-next sentence triplets dataset using the keyword-text pairs dataset and the text summarization model.

19. The non-transitory computer-readable memory of claim 18, wherein the method further includes:

tokenizing sentences of a paragraph of the text of a keyword-text pair of the keyword-text pairs dataset; and recursively calculating, using the text summarization model, text summaries of the tokenized sentences.

20. The non-transitory computer-readable memory of claim 19, wherein the generating the summary-keyword-next sentence triplets dataset further includes:

associating, with a text summary of one or more first tokenized sentences of a preceding text of a paragraph, keywords that are present in a subsequent text of the paragraph that follows the preceding text, the one or more first tokenized sentences being included in the tokenized sentences, and associating, the keywords that are present in the subsequent text, with one or more second tokenized sentences of the subsequent text, the one or more second tokenized sentences being included in the tokenized sentences.

* * * * *